(12) United States Patent
Bhaskaran et al.

(10) Patent No.: US 12,174,423 B2
(45) Date of Patent: Dec. 24, 2024

(54) OPTICAL WAVEGUIDE AND DEVICES

(71) Applicant: Oxford University Innovation Limited, Oxford (GB)

(72) Inventors: Harish Bhaskaran, Oxford (GB); Wen Zhou, Oxford (GB); Xuan Li, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 14 days.

(21) Appl. No.: 18/009,749

(22) PCT Filed: Jun. 16, 2021

(86) PCT No.: PCT/GB2021/051528
§ 371 (c)(1),
(2) Date: Dec. 12, 2022

(87) PCT Pub. No.: WO2021/255451
PCT Pub. Date: Dec. 23, 2021

(65) Prior Publication Data
US 2023/0221490 A1    Jul. 13, 2023

(30) Foreign Application Priority Data

Jun. 16, 2020 (GB) .................................. 2009151

(51) Int. Cl.
*G02B 6/126* (2006.01)
*G02B 6/12* (2006.01)
*G02B 6/27* (2006.01)

(52) U.S. Cl.
CPC ........... *G02B 6/126* (2013.01); *G02B 6/2733* (2013.01); *G02B 2006/12035* (2013.01)

(58) Field of Classification Search
CPC .................. G02B 6/126; G02B 6/2733; G02B 2006/12035; G02B 6/122; G02F 1/218; G02F 1/225; G02F 1/0147
See application file for complete search history.

(56) References Cited

U.S. PATENT DOCUMENTS

| 5,128,099 A | 7/1992 | Strand et al. |
| 5,341,358 A | 8/1994 | Kobayashi et al. |

(Continued)

FOREIGN PATENT DOCUMENTS

| WO | 2017/187151 A1 | 11/2017 |
| WO | 2018/183883 A1 | 10/2018 |
| WO | 2018/224807 A1 | 12/2018 |

OTHER PUBLICATIONS

International Search Report and Written Opinion for WO 2021/255451 (PCT/GB2021/051528), dated Sep. 29, 2021, pp. 1-16.
UK Search Report for GB 2009151.8, dated Nov. 24, 2020, 1 page.
Weiling Dong et al., "Wide band gap phase change material tuned visible photonics", arXiv:1808.06459v2 [physics.optics] Aug. 27, 2018, pp. 1-19.
Lu, L. et al., "Sb2S3 phase change tuneable photonics", Sb2S3 phase change tuneable photonics. 52-53. Abstract from IPS meeting 2019, Singapore, pp. 1-2.

(Continued)

*Primary Examiner* — John Bedtelyon
(74) *Attorney, Agent, or Firm* — Thomas|Horstemeyer, LLP

(57) ABSTRACT

An optical waveguide (100) is disclosed, for guiding light in a photonic circuit comprising a layer of phase change material (101) for modulating the phase of the guided light. The phase change material (101) is switchable between at least a stable crystalline state and a stable amorphous state each with different refractive indexes. The phase change material (101) exhibits an extinction coefficient of less than 0.1 in both states for wavelengths greater than 1000 nm.

19 Claims, 16 Drawing Sheets

(56) References Cited

U.S. PATENT DOCUMENTS

| | | |
|---|---|---|
| 6,684,003 B2 | 1/2004 | Lipson et al. |
| 7,684,664 B2 * | 3/2010 | Digonnet et al. |
| 10,634,938 B2 * | 4/2020 | Fang ............... C23C 14/0623 |
| 2004/0027646 A1 | 2/2004 | Miller et al. |
| 2004/0096144 A1 | 5/2004 | Ramalingam et al. |
| 2006/0140535 A1 | 6/2006 | Tsuda et al. |
| 2013/0043375 A1 | 2/2013 | Baleine et al. |

OTHER PUBLICATIONS

Xu, P., Zheng, J., Doylend, J. K., Majumdar, A. Low-loss and broadband nonvolatile phase-change directional coupler switches. ACS Photonics 6, 553 (2019).

De Leonardis F., Soref R., Passaro V. M. N., Zhang Y., Hu J., Broadband electro-optical crossbar switches using low-loss $Ge_2Sb_2Se_4Te_1$ phase change material, J. Lightw. Technol., 37(13), 3183-3191 (2019).

Pernice, W. H. P. & Bhaskaran, H. Photonic non-volatile memories using phase change materials. App. Phys. Lett. 101, 171101 (2012).

Rios, C., Hosseini, P., Wright, C. D., Bhaskaran, H. & Pernice, W. H. P. On-Chip Photonic Memory Elements Employing Phase-Change Materials. Adv. Mater. 26, 1372-1377 (2013).

Rios, C. et al. Integrated all-photonic non-volatile multi-level memory. Nat. Photonics (2015). doi:10.1038/nphoton.2015.182.

International Preliminary Report on Patentability for WO 2021/255451 (PCT/GB2021/051528), dated Dec. 13, 2022, pp. 1-7.

* cited by examiner

OPTICAL WAVEGUIDE AND DEVICES

CROSS-REFERENCE TO RELATED APPLICATIONS

This application is the National Stage of International Application No. PCT/GB2021/051528, filed Jun. 16, 2021, which claims priority to GB 2009151.8, filed Jun. 16, 2020, which are entirely incorporated herein by reference.

TECHNICAL FIELD

This invention relates generally to an optical waveguide for a photonic circuit and devices utilising the optical waveguide. Particularly, but not exclusively, the invention relates to an optical waveguide comprising a layer of phase change material as a non-volatile phase shifting element.

BACKGROUND TO THE INVENTION

In photonic circuits, light can be controllably routed through a network of optical waveguides by various optical switching and power splitting devices. Such devices typically operate by controlling the phase of light in the waveguides. For example, by tuning the phase of silicon-on-insulator (SOI) waveguides, microring resonators and Mach-Zehnder interferometers (MZIs) can show optical switching and power splitting functions. In another example, directional couplers can evanescently couple varied amounts of light between closely spaced waveguides by tuning their relative phase. The phase-shifting mechanism is typically based on the thermal-optic or free carrier dispersion effect. However, the length of the waveguides in such devices is relatively long to realize the required phase shift due to weak perturbations to the refractive index. For example, a MZI is around 500 μm to realize the required $\pi$ phase shift. A micoring has a compact footprint, however, the working bandwidth is limited by the resonant condition. Another approach is to use electrostatic micro-electromechanical system (MEMS) switches in photonic circuits, in which coupled waveguides can be mechanically moved to tune the coupling efficiency. However, the switching speed is low, on the order of milliseconds, the footprint is not compact, and the fabrication cost and complexity is relatively high compared to conventional non-mechanical approaches. Importantly, the above technologies are volatile, i.e., the state of the device is maintained under constant basing and power consumption.

Phase-change materials (PCMs) offer intrinsic non-volatility and have been exploited in a wide range of photonic applications including photonic memory devices, rewritable discs, optical filters, displays and optical switches. PCMs are readily deposited on arbitrary substrates using standard techniques, and can be switched back and forth between amorphous and crystalline states with high-speed and long-term stability. The refractive index changes drastically between amorphous and crystalline states upon switching. Compact optical switches with $Ge_2Sb_2Te_5$ (GST) and $Ge_2Sb_2Se_4Te_1$ (GSST) on top of waveguide couplers have been demonstrated with fast switching speeds (100 ns) and low power consumption. As such, PCM-based photonic devices offer several advantages to traditional photonic switching schemes and are a promising candidate for developing large scale non-volatile re-programmable photonic routing systems, such as field programmable coupler arrays. However, to date, all PCM-based photonic devices exhibit strong absorption losses, especially in the crystalline state over the telecommunication wavelengths bands (1200-1700 nm). For example, the insertion loss is at least 1 dB for known PCM-based optical switching devices. The strong absorption loss of known PCM-based photonic devices ultimately limits their performance and function in photonic circuits and restricts their potential for scale-up in programmable photonic routing systems.

Aspects and embodiments of the present invention have been devised with the foregoing in mind.

SUMMARY OF THE INVENTION

According to a first aspect of the invention, there is provided an optical waveguide for guiding light in a photonic circuit, comprising a layer of phase change material (PCM) for modulating the phase of the guided light. The layer of PCM is switchable between at least two stable (solid) states having a different refractive index in each stable state for a given wavelength of light. The layer of PCM has a refractive index that is switchable between at least two stable values. The extinction coefficient of the PCM generally decays with increasing wavelength of light. The PCM exhibits an extinction coefficient (k) of less than substantially 0.1 in both stable states for wavelengths greater than 1000 nm.

The at least two stable solid states include an amorphous state and a crystalline state. Each stable state of the PCM corresponds to a different effective refractive index and phase-shifting character of the waveguide, thus changing the phase shift imparted on the light propagating through the waveguide.

The waveguide advantageously provides a platform for developing various non-volatile switchable phase shifting-based devices for photonic circuits that operate with low or substantially no loss (attenuation) over a broad wavelength band that covers the telecommunication wavelength bands. Light guided by the waveguide can be phase shifted without attenuation by switching the state of the PCM. The accumulated phase of light in the waveguide is dependent on the length of the layer of PCM. This is not achievable in commonly used PCMs such as $Ge_2Sb_2Te_5$ (GST) and $Ge_2Sb_2Se_xTe_{5-x}$ (GSST) which have a non-zero extinction coefficient in at least one useful stable state from the visible to short-wave infrared wavelength range or longer (i.e. for wavelengths less than 1700 nm).

The term "light" refers electromagnetic radiation or waves with a wavelength in the range from ultraviolet (UV) to infrared (IR) that can propagate in free space as well as being guided with a waveguide, e.g. between 10 nm and 100 μm.

The term "stable state" may mean substantially stable at National Institute of Standards and Technology (NIST) standard temperature and pressure conditions. An optical waveguide is defined as any structure used for guiding light in a propagation direction parallel to its axis, by confining it in one or more dimensions to a region within or adjacent to its surfaces. A waveguide is formed by a sequence of layers/regions with different refractive indices, usually comprising an inner or core layer/region of higher refractive index material compared to surrounding/outer or cladding layers/regions. In this context, the waveguide confines light in two dimensions, i.e. to a channel, in a thickness/growth and a lateral/width direction perpendicular to the thickness/growth direction. The core and/or cladding layers/regions may be referred to as guiding layers that actively take part in the confinement and guiding of light.

In an embodiment, the phase change material is formed of or comprises a chalcogenide comprising antimony. For example, the phase change material may be formed of or comprise antimonide trisulphide ($Sb_2S3$) and/or antimonide triselenium (Sb2Se3). In an embodiment, the phase change material is formed of or comprises antimonide trisulphide ($Sb_2S_3$). The PCM may exhibit an extinction coefficient (k) of less than substantially 0.05, or less than substantially 0.01, or of substantially zero, in both the crystalline and amorphous states for wavelengths greater than 1000 nm. The PCM may also exhibit this extinction coefficient for wavelengths greater than 585 nm, or greater than 600 nm, or greater than 700 nm, or greater than 800 nm, or greater than 900 nm. In an embodiment, the PCM exhibits an extinction coefficient of less than substantially 0.05, or less than substantially 0.01, or of substantially zero, in both the crystalline and amorphous states at a wavelength of 1550 nm.

The term "substantially zero" may mean at or below the noise floor/detection limit of a standard measurement apparatus such as an ellipsometer, which in practice may be at or below 0.001.

The PCM may exhibit a refractive index difference (i.e. the difference in the real part of refractive index) between the crystalline and amorphous states of at least 0.1, or at least 0.2, or at least 0.3, or at least 0.4, or at least 0.6 for wavelengths greater than 1000 nm. The PCM may also exhibit this refractive index difference for wavelengths greater than 585 nm, or greater than 600 nm, or greater than 700 nm, or greater than 800 nm, or greater than 900 nm. In an embodiment, the PCM exhibits a refractive index difference between the crystalline and amorphous states of at least 0.1, or at least 0.2, or at least 0.3, or at least 0.4, or at least 0.6 at a wavelength of 1550 nm.

The waveguide may comprise a first layer formed of a first material, and the layer of PCM may be provided on or over or on top of the first layer. The first layer may be a (first) guiding layer configured to guide and/or confine light in at least a thickness direction.

The first layer may be formed of or comprise a material selected from the group comprising: silicon (Si), silicon oxide ($SiO_2$), silicon nitride (SiN), indium phosphide (InP), gallium phosphide (GaP), germanium (Ge), lithium niobate ($LiNbO_3$), aluminium nitride (AlN), or any group IV or III-V semiconductor with a band gap higher than the wavelength of light.

The first layer may formed of or comprise: a silicon layer of a silicon-on-insulator (SOI) substrate; a silicon nitride layer of a silicon nitride -on-insulator substrate; or a lithium-niobate layer of a lithium-niobate—on-insulator substrate.

The layer of PCM may have a length in the direction of propagation of light. The length of PCM may define a first or phase-shifting (longitudinal) portion of the waveguide. The length of the layer of PCM determines the phase shift imparted on the guided light by the first or phase-shifting (longitudinal) portion of the waveguide. The PCM can be any length, according to the application and waveguide structure. In an embodiment, the length of the layer of PCM is at least, 1 µm, 2 µm, 5 µm, 10 µm, 20 µm, 30 µm, or 40 µm.

The thickness of the layer of PCM also affects the resulting phase shift of the waveguide. The PCM can in principle be any thickness, according to the application and waveguide structure. In an embodiment, the layer of PCM may have a thickness of at least 10 nm, 20 nm, or 30 nm. The layer of PCM may have a thickness in the range between substantially 30 nm to 200 nm.

In an embodiment, the waveguide is configured such that light is, at least partially, guided by the layer PCM over its length. For example, the layer of PCM may form at least part of a (second) guiding layer (e.g. a core or cladding layer) of the waveguide for guiding and/or confining light in a width and/or thickness direction. This is possible due to the low absorption loss (extinction coefficient) in the PCM that allows for light propagation in the layer of PCM with negligible attenuation. This is not possible in waveguides comprising GST or GSST due to strong absorption losses. As such, the waveguide may be referred to as a hybrid PCM waveguide.

The layer of PCM may be configured to define the lateral width of the waveguide over the length of the PCM. The layer of PCM may be configured to confine light in a width direction. The layer of PCM may be a second guiding layer provided on the first guiding layer to define the lateral width of the waveguide. In this case, the first guiding layer may be a core layer and the layer of PCM may be or comprise a cladding layer.

The refractive index of the layer of PCM may be lower than the refractive index of the first material in at least one of the two stable states for confining light.

The layer of PCM may be patterned or comprise a pattern for defining the lateral width of the waveguide. The layer of PCM may be provided or patterned as a strip or ridge pattern, wherein the width of the strip or ridge defines the lateral width of the waveguide.

The layer of PCM or the phase-shifting waveguide portion may have a first end and a second end (which defines its length therebetween). The waveguide may further comprise a second or routing waveguide portion coupled (end on) to the first and/or second end of the phase-shifting waveguide portion for routing light to and/or from the phase-shifting waveguide portion, wherein the or each second/routing waveguide portion does not comprise a layer of PCM.

This may advantageously allow the phase-shifting portion of the waveguide to be seamlessly connected with a conventional waveguide, allowing co-integration of the hybrid PCM waveguide with commercially produced photonic circuits, such as silicon photonics. The effective refractive index and modal profile of the two waveguide portions may be configured for impedance matching.

The second/routing waveguide portion may comprise a third layer provided on the first layer in a pattern to define the lateral width of the routing/second waveguide portion. The third layer may be provided or patterned as a strip or ridge, wherein the width of the strip or ridge defines the lateral width of the waveguide. The third layer may be integral with the first layer and/or formed of the same material as the first material of the first layer. Alternatively, the third layer may be formed of a different material to the first material of the first layer.

In another embodiment, the layer of PCM may not play a critical role in guiding of light. In this case, the first layer is a guiding layer configured to at least partially guide and/or confine light in a width and thickness direction. As such, in this embodiment, the first layer defines the lateral width of the waveguide, and the layer of PCM is provided over the first layer and is evanescently coupled to the guided light in the waveguide.

The waveguide may further comprise a capping or passivation layer that covers and/or encapsulates at least the layer of PCM and optionally, where present, the third layer. The capping layer may have a refractive index that is lower than that of the PCM (in the two stable states) and first layer for confining light. The capping layer may be formed of or comprise an oxide, e.g. silicon dioxide (SiO$_2$), silicon nitride (SiN), or aluminium oxide (Al$_2$O$_3$). In principle, the thickness of the capping layer is not crucial and does not impact the phase-shifting properties of the waveguide. The capping layer may have a thickness of at least 1 nm, 5 nm, or 10 nm. The capping layer may have a thickness between 1 and 100 nm, 5 and 100 nm, or 10 and 100 nm, e.g. approximately 1 nm, 5 nm, 10 nm, 20 nm, 30 nm, 40 nm, 50 nm, 60 nm, 70 nm, 80 nm, 90 nm or 100 nm. The capping layer may advantageously protect the layer of PCM from the environment and improve its stability.

The layer of PCM may be switchable between the at least two stable states upon application of heat at a predetermined temperature for a predetermined period of time. The layer of PCM may be switchable from the amorphous state to the crystalline state upon application of heat at a first temperature for a first period of time, and switchable from the crystalline state to the amorphous state upon application of heat at a second temperature for a second period of time. The first temperature may be lower than the second temperature, and the first period of time may be longer than the second period of time. The first temperature may be the crystallisation point, and the second temperature may be the melting point. The crystallisation point of Sb$_2$S$_3$ may be approximately 290 degrees Celsius. The melting point of Sb$_2$S$_3$ may be approximately 550 degrees Celsius.

The state of the layer of PCM may be switched optically or electrically. Optical switching may be achieved by an incident optical pulse with sufficient power to heat the PCM. The optical pulse for switching may a free space optical pulse (e.g. focussed on the PCM) or coupled to the PCM via the waveguide. Electrical switching may be achieved by using a heater in thermal contact with the layer of PCM or by passing an electrical current through the layer of PCM.

The waveguide may further comprise a resistive heating element (heater) in thermal contact with at least a longitudinal portion of the layer of PCM for switching the state of the PCM at least at that longitudinal portion. The waveguide may comprise a plurality of resistive heating elements, each in thermal contact with separate longitudinal portion of the layer of PCM for switching the state of the phase change material at least at the respective longitudinal portions.

The heating element may be formed by ion implantation of silicon, to form a doped channel that forms a resistive heating element. The heating element may be doped p-type, for example using Boron. The implanted silicon heating element may form part of the waveguide.

Alternatively, the waveguide may comprise a pair of electrodes coupled to the layer of PCM for driving an electrical current through the PCM to switch the state of the PCM.

The waveguide may comprise a plurality of layers of PCM distributed along the length of the waveguide. Each layer of PCM may define a separate phase-shifting portion of the waveguide. Each layer of PCM may have the same or different length.

The waveguide may be configured to be a single (TE) mode waveguide.

According to a second aspect of the invention, there is provided an optical device for a photonic circuit, comprising a first waveguide and a second waveguide according to the first aspect. The first and second waveguides are arranged substantially parallel and spaced apart by a lateral gap, over at least a coupling region thereof, such that light can evanescently couple from the first waveguide to the second waveguide (or vice versa) in the coupling region. The degree of optical coupling from the first waveguide to the second waveguide (or vice versa) is dependent on the relative states of the PCM of the first waveguide and the second waveguide in the coupling region.

The geometry of the first and second waveguides in transverse cross-section may be substantially the same over the length of the layer of PCM or the coupling region. The width and thickness of the first and second waveguides, or of the first and second waveguides over the coupling region, may be substantially the same. The width and thickness of layer of PCM of the first and second waveguides in the coupling region may be substantially the same. The length of the coupling region may be less than the length of the respective waveguides. The length of the coupling region may be less than the length of the layer of PCM of the respective waveguides.

In an embodiment, the PCM of the first and second waveguides in the coupling region is configurable to be in the same state (i.e. both crystalline or both amorphous) or different states (i.e. one crystalline and the other amorphous) to selectively couple light from the first waveguide to the second waveguide. The degree of optical coupling from the first waveguide to the second waveguide (or vice versa) may also be dependent on the length of the coupling region. The length of the coupling region may be equal to a critical coupling length for phase matching. The critical coupling length is the minimum length of the coupling region between adjacent waveguides necessary for complete optical power transfer from one waveguide to the other. This may allow substantially all light to be selectively coupled from the first waveguide to the second waveguide. The critical coupling length for phase matching is dependent on the wavelength of light and the waveguide properties, and is defined by coupled mode theory as: $Lc=\lambda/(2n_e-2n_o)$, where $\lambda$ is the wavelength of light, and $n_e$ and $n_o$ are effective indices of even and odd modes in the coupled waveguides.

This can provide an optical switching function of the device. Light guided along the first waveguide can evanescently couple/transfer across to the second waveguide with almost 100% efficiency when the waveguides are phase matched, i.e. when the length of the coupling region is optimised (equal to the critical coupling length) and the PCM of each waveguide in the coupling region is configured in the same state, such as the crystalline state or the amorphous state, such that the waveguides have the same effective refractive index. Conversely, coupling between the two waveguides is relatively weak when the PCM of waveguides in the coupling region is configured to be in different states (i.e. one crystalline and the other amorphous), such that only a negligible amount of light (preferably no light) couples/transfers across to the second waveguide. Choosing the same state to be the crystalline state may have practical advantages, since the PCM may initially be in the amorphous state when deposited.

The device may further comprise a third waveguide according to the first aspect. The third waveguide is arranged substantially parallel to and spaced apart from the first or second waveguide by a lateral gap, over at least a respective coupling region thereof, such that light can evanescently couple from the first or second waveguide to the third waveguide in the respective coupling region. The lateral gap separating the first and third waveguides may be the same as the lateral gap separating the first and second waveguides. The degree of optical coupling from the first or second waveguide to the third waveguide is dependent on the relative states of the PCM of the first or second waveguide and the third waveguide in the coupling region.

The PCM of the first or second waveguide and third waveguides in the coupling region may be configurable to be in the same state or different states to selectively couple light from the first or second waveguide to the third waveguide. The length of the coupling region of the first or second waveguide and the third waveguides may be equal to a critical coupling length for phase matching to selectively couple substantially all light from the first or second waveguide to the third waveguide.

The PCM of the second and third waveguides in the respective coupling region may be configurable to be in different states to selectively couple light from the first waveguide to the second or third waveguide.

In an embodiment, the length of the coupling region is equal to a critical coupling length for phase matching, and at least a longitudinal portion of the PCM of each waveguide (the first and second waveguide, or the first and third waveguide, or the second and third waveguide) in the coupling region is in the same state (e.g. crystalline or amorphous) and those portions overlap by an overlap length that is variable. In this way, the degree of optical coupling or the optical power transfer between respective adjacent waveguides can be varied by controlling/varying the overlap length.

This may provide a variable power splitting function of the device. Light guided along the first waveguide can evanescently couple/transfer across to the second and/or third waveguide with variable efficiency by varying the overlap length of the respective crystalline or amorphous portions in the adjacent waveguides. The splitting ratio can be variable by tuning the overlap length. For example, the optical coupling from the first waveguide to the second and/or third waveguide may be variable between a minimum and a maximum value (e.g. 0-100%) by varying the overlap length between zero and the critical coupling length for phase matching. This allows the optical power output from the waveguides in the device to be controlled by selectively switching the state of at least portions of the PCM in the waveguide in the coupling region(s).

The PCM of at least one of the respective waveguides in the coupling region may comprise at least two portions each in a different state, i.e. a first portion in a crystalline state and second portion in an amorphous state.

According to a third aspect of the invention, there is provided a photonic field programmable coupler array (FPCA) comprising an array of waveguides according to the first aspect. The waveguides are arranged substantially parallel to and spaced apart from each by a lateral gap, over at least a respective coupling region thereof, such that light can evanescently couple from one waveguide to an adjacent waveguide in the respective coupling region. At least a longitudinal portion of the PCM of each waveguide in the respective coupling region is configurable to be in the same state (a crystalline or amorphous state) and overlap the corresponding longitudinal portion (i.e. the corresponding crystalline or amorphous portion) of an adjacent waveguide by an overlap length to selectively transfer light across two or more adjacent waveguides in the array.

The overlap length of the respective longitudinal portions (i.e. the respective crystalline or amorphous portions) may be equal to a critical coupling length for phase matching. In this case, substantially all light may be selectively transferred across two or more adjacent waveguides in the array. Alternatively, the overlap length may be between zero and the critical coupling length to transfer a variable amount of light between adjacent waveguides. The overlap length between each pair of adjacent waveguides may be the same or different.

In this way, light can be routed from an arbitrary input waveguide to any number of arbitrary output waveguides by configuring/patterning the phase states in the arrayed waveguides.

According to a fourth aspect of the invention, there is provided a Mach-Zehnder interferometer (MZI) for a photonic circuit. The MZI comprises first and second parallel optical paths, wherein the first and/or second optical path comprises a waveguide according the first aspect.

In an embodiment, the layer of PCM in one of the arms may have a length sufficient to selectively shift the phase of the light by λ and thus control the output of the MZI between a maximum and a minimum value for a given wavelength.

According to a fifth aspect of the invention, there is provided a photonic circuit comprising one or more waveguides according to the first aspect, and/or a device of the second aspect, and/or a FPCA according to the third aspect, and/or a MZI according to the fourth aspect.

Embodiments of the present invention enable calculations to be performed in the optical domain. For example, it is well known that Mach-Zehnder devices may be used to perform all optical multiplication (e.g. of matrices). Such multiplication operations underpin many computational applications, such as convolutional neural networks. Performing calculations in the optical domain is potentially faster than doing so in the optical domain. Embodiments of the present disclosure provide for a reconfigurable optical calculation device that is an optical analogue for the familiar field programmable gate array (FPGA). A reconfigurable optical calculation engine can be provided in accordance with some embodiments. Such a device may be provided with an electrical controller, and electrical inputs and outputs, with conversion to and from the optical domain taking place on-device (e.g. via integrated lasers and photodiodes). The controller may be configured to change states of one or more phase change material regions of the device to configure the optical calculation engine, analogous to writing a configuration to an FPGA.

Aspects and embodiments of the invention provide advantages of substantially lossless phase shifting, non-volatility, broadband operation, compact footprint, re-configurability, scalability, ultrafast switching, and low-power consumption.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to a method, and these embodiments are specifically envisaged.

BRIEF DESCRIPTION OF DRAWINGS

In order that the invention can be well understood, embodiments will now be discussed by way of example only with reference to the accompanying drawings, in which.

Figure 1:
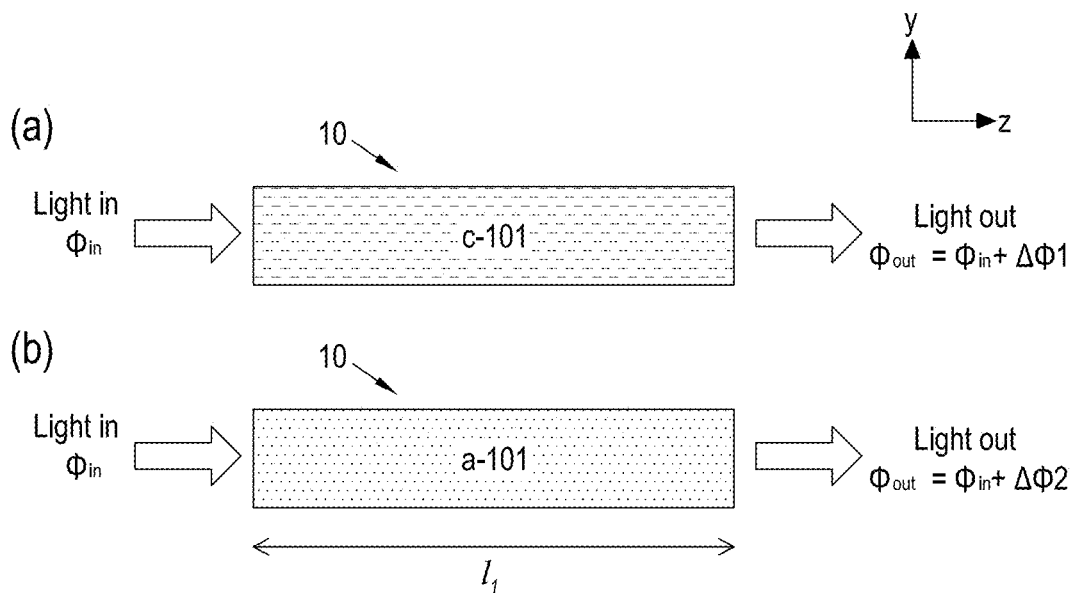
FIGS. 1(a) and (b) show a schematic top view of an optical waveguide comprising a layer of phase change material in a crystalline and an amorphous state, respectively.

It should be noted that the figures are diagrammatic and may not be drawn to scale. Relative dimensions and proportions of parts of these figures may have been shown exaggerated or reduced in size, for the sake of clarity and convenience in the drawings. The same reference signs are generally used to refer to corresponding or similar features in modified and/or different embodiments.

DETAILED DESCRIPTION

FIGS. 1(a) and (b) show a schematic top view of an optical waveguide 10 for a photonic circuit according to the invention. Light input at one end of the waveguide 10 is guided along the axis (z) of the waveguide 10 to the other end in one or more waveguide modes. Each mode propagates with a phase velocity of $c/n_{eff}$, where c is the speed of light in vacuum and $n_{eff}$ is the effective refractive index of the mode. The dimensions of the waveguide 10 determine which modes can exist, and preferably the waveguide 10 is configured to support a single mode.

The waveguide 10 is formed of a sequence of layers/regions with differing refractive indices and is patterned so as to confine light in two dimensions to a channel suitable for a photonic circuit. The waveguide 10 comprises a layer of phase change material (PCM) 101 for modulating the phase of light guided by the waveguide 10. The PCM 101 is switchable between at least two stable solid states, which include an amorphous state a-101 (see FIG. 1(b)) and a crystalline state c-101 (see FIG. 1(a)), each having a different refractive index. Each stable solid state of the PCM 101 corresponds to a different effective refractive index $n_{eff}$ and thus phase-shifting character of the waveguide 10. As such, light input to the waveguide 10 with an initial phase $\phi_{in}$ accumulates a phase shift $\Delta\phi 1$, $\Delta\phi 2$ over the length $l_1$ of the layer of PCM 101 due to the differing phase velocity that is dependent on the length $l_1$ of the PCM 101 and its state (i.e. crystalline or amorphous). Importantly, the PCM 101 is characterised by exhibiting an extinction coefficient (k) of less than 0.1, and preferably substantially zero (in practice, this is below the noise floor/detection limit of a standard measurement apparatus such as an ellipsometer), in both the crystalline and amorphous states for wavelengths ($\lambda$) above 1000 nm. The waveguide 10 therefore exhibits low or substantially no optical loss (i.e. attenuation) over a broad wavelength band that covers the telecommunication wavelength bands, and can form the basis of various non-volatile switchable phase shifting-based devices for photonic circuits, some examples of which are described below.

In an embodiment, the PCM 101 is antimonide trisulphide ($Sb_2S_3$ or SbS) or antimony triselenium ($Sb_2Se_3$). SbS is a wide-bandgap PCM with a bandgap that is tunable between 1.7-2.0 eV. SbSe is a similar wide-bandgap PCM with a bandgap that is tunable over an even broader range. For SbS, the imaginary part of refractive index (the extinction coefficient, k) is substantially zero in both the crystalline and amorphous states for wavelengths longer than approximately 900 nm. Similarly, for SbSe the extinction coefficient is substantially zero in both crystalline and amorphous states for wavelengths longer than approximately 1000 nm.

Figure 2A:
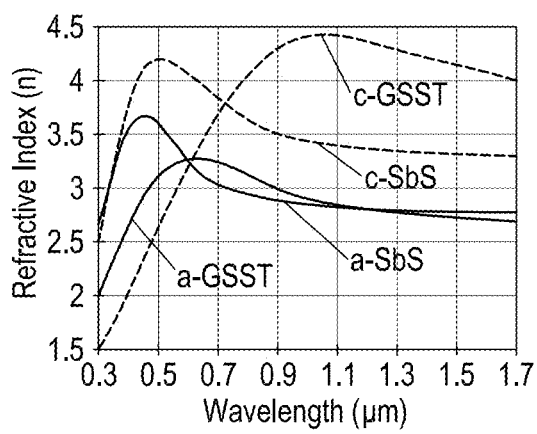
FIGS. 2(a), 2(b) and 2(c) show the refractive index and extinction coefficient for various phase change materials as a function of wavelength.
Figure 2B:
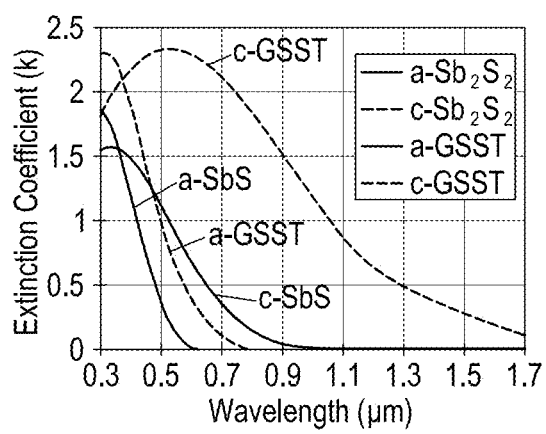
Figure 2C:
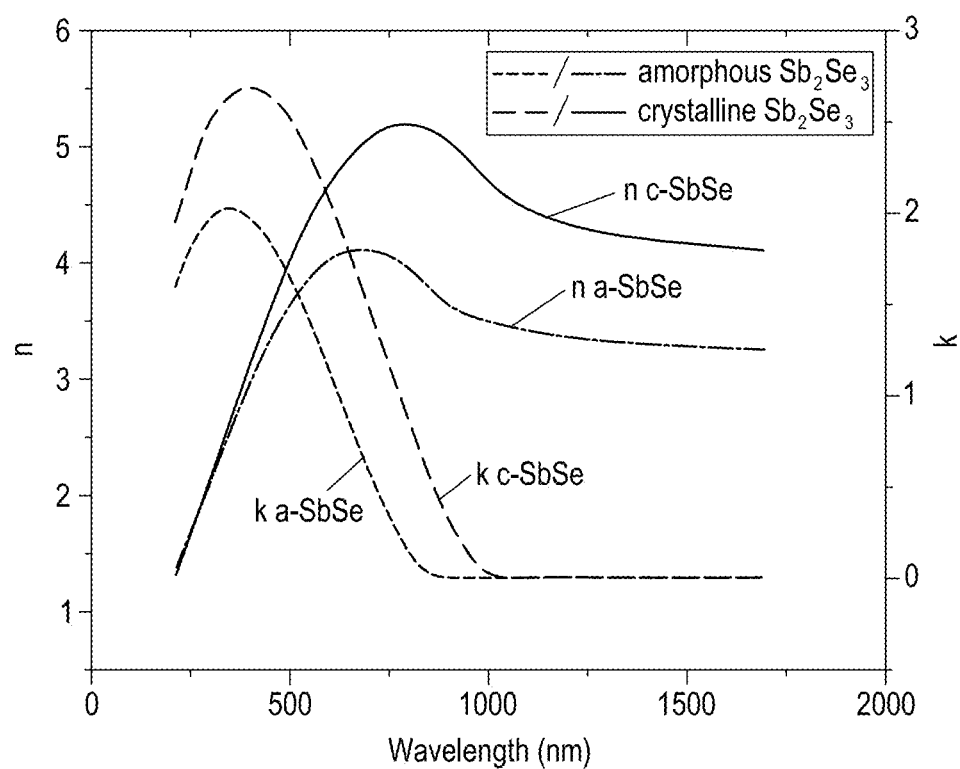

FIGS. 2(a), 2(b) and 2(c) show experimental measurements of the real (n) and imaginary (extinction coefficient, k) parts of the refractive index of a sputtered SbS and a sputtered SbSe layer as a function of wavelength in the visible to near-infrared (IR) range (300 nm to 1700 nm) in the amorphous (a-) and crystalline (c-) states obtained from ellipsometry. Corresponding data for a sputtered layer of $Ge_2Sb_2Se_xTe_{5-x}$ (GSST), a widely studied candidate PCM for non-volatile photonic applications, is also shown for comparison. The SbS layers exhibits a change in refractive index, $\Delta n$, of approximately 0.5 upon switching between its amorphous and crystalline states, and an extinction coefficient k of substantially zero (less than the noise floor of the ellipsometer) in both states for wavelengths above 900 nm. At $\lambda$=1550 nm, the SbS layer exhibits a refractive index n of approximately 2.7 and 3.3 in the amorphous and crystalline states, respectively. The SbSe layers exhibits a change in refractive index, $\Delta n$, of approximately 1 upon switching between its amorphous and crystalline states, and an extinction coefficient k of substantially zero (less than the noise floor of the ellipsometer) in both states for wavelengths above 1000 nm. At $\lambda$=1550 nm, the SbS layer exhibits a refractive index n of approximately 3.4 and 4.1 in the amorphous and crystalline states, respectively. By contrast, although the GSST layer exhibits a larger $\Delta n$, it shows a strong non-zero extinction coefficient k at least in the crystalline state from the visible to near-IR wavelength range (at least up to 1.7 µm, as shown). This demonstrates that antimony based chalcogenides such as SbS and SbSe can be used in a phase-only hybrid-PCM waveguide for light guiding and phase shifting at practical wavelengths, as described in more detail below.

It will be appreciated that in practice the refractive index of a suitable chalcogenide layer such as SbS or SbSe may vary slightly depending the deposition technique and conditions. For example, in another SbS layer deposited by sputtering under different conditions to the layer of FIGS. 2(a) and 2(b) above, the refractive index at $\lambda$=1550 nm changes from approximately 2.61 and 2.74 ($\Delta n \sim 0.11$) upon switching from the amorphous to crystalline states (not shown). The phase-shifting function of the waveguides 10 is not limited to a specific $\Delta n$ value as long as it is non-zero, but a $\Delta n$ of at least 0.1 is preferable to achieve sizable phase shifts over practical distances. For example, the change in refractive index, $\Delta n$, of a SbS layer may be a range between approximately 0.1 and 0.6 depending the deposition technique and conditions. Any physical or chemical deposition method can be used to deposit the phase change material (e.g. SbS or SbSe), such as electron beam evaporation, sputtering, atomic layer deposition, etc. as is known in the art. Preferably, radio frequency (RF) sputtering is used for deposition of an antimony based chalcogenide (e.g. SbS or SbSe).

Because the PCM 101 is substantially lossless, the layer of PCM 101 in the waveguide 10 of the present invention can be arranged to interact strongly with the light, providing large phase shifts over practical lengths (e.g. on the order of $\pi$ for length less than 40 µm) and various additional functionalities not possible with known GSST or $Ge_2Sb_2Te_5$ (GST) functionalised waveguides, as described in more detail below.

Figure 3A:
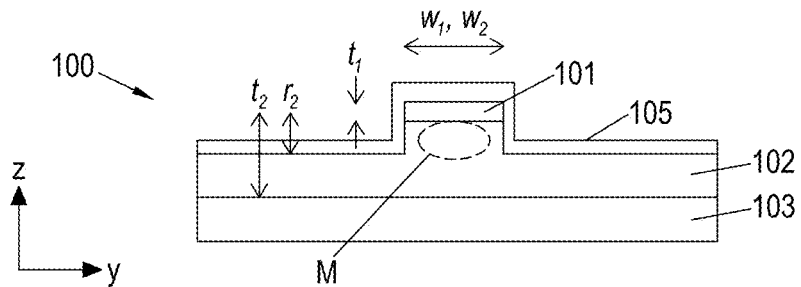
FIGS. 3(a) and 3(b) show schematic cross-sections of an optical waveguide comprising a layer of phase change material according to an embodiment.
Figure 3B:
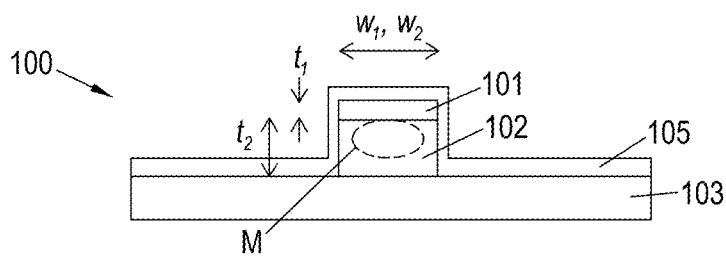

FIGS. 3(a) and 3(b) show example configurations of a first embodiment 100 of the waveguide 10 where the layer of PCM 101 is provided over a ridge or strip waveguide for phase-only modulation. The waveguide 100 comprises, in order, second layer 103, a first layer 102 provided on the second layer 103, and a layer of PCM 101 provided on/over the first layer 102. The first layer 102 is formed of a material with a higher refractive index than the material of the second layer 103 to confine light in a thickness direction (z-direction) to the first layer 102. The second layer 103 may be a substrate layer or part of a substrate layer. The first layer 102 forms a ridge or strip pattern with a width $w_2$ (e.g. by patterning the first layer 102) as shown in FIGS. 3(a) and 3(b), respectively, to confine light in the width direction (y-direction). In both cases, the width $w_2$ of the ridge or strip defines the lateral width of the waveguide 100. As such, the first layer 102 is configured to (at least partially, see below) confine and guide light in both the thickness direction (z-direction) and width direction (y-direction). The resulting waveguide fundamental mode M is indicated by the dashed region.

The layer of PCM 101 is provided over of the ridge or strip and is evanescently coupled to the light confined therein to modulate the phase of light over its length $l_1$. In the illustrated embodiments the width $w_1$ of the layer of PCM 101 substantially matches the width $w_2$ of the ridge or strip. However, this is not essential. In practice, the PCM 101 of the waveguide 100 need only at least partially cover the top of the strip of ridge to interact with the light sufficiently to alter its phase. For example, the width $w_1$ of the layer of PCM 101 may be less than the width $w_2$ of the ridge or strip, or it can be greater, e.g. extending over the top and sides of the ridge or strip (e.g. see FIG. 4(a)).

It will be appreciated that in most practical applications the waveguide 100 is configured such that light can already be well guided by the ridge/strip of the first layer 102 alone (without the PCM), and the layer of PCM 101 does not play a critical role in the confinement and guiding of light (enabling straightforward co-integration of the waveguide 200 with conventional silicon (or other material) strip or ridge waveguides of a photonic circuit). However, dependent on the geometrical and/or material parameters of the underlying ridge/strip of the first layer 102, if light is not well guided by the ridge/strip of the first layer 102 alone (i.e. only leaky modes exist), then the layer of PCM 101 can play a critical role in light guiding, e.g. by increasing the effective index of the guided mode above the continuum states (which are leaky modes), so there is no coupling to the leaky modes.

In an embodiment, the first layer 102 is formed of silicon (Si) and the second layer 103 is formed of silicon oxide ($SiO_2$). In a preferred embodiment, the first and second layers 102, 103 are the top silicon and $SiO_2$ layers of a silicon-on-insulator (SOI) substrate. However, it will be appreciated that the first and second layers 102, 103 can be formed of any suitable semiconductor (a group IV or III-V semiconductor), oxide, or dielectric material that is substantially transparent to the wavelength of guided light, including but not limited to silicon, silicon nitride (SiN), $SiO_2$, germanium (Ge), indium phosphide (InP), gallium phosphide (GaP), aluminium nitride (AlN), lithium niobate ($LiNbO_2$).

The waveguide 100 may further comprise a capping or passivation layer 105 covering at least the layer of PCM 101. The capping layer 105 is formed of a material with a refractive index lower than that of the PCM 101 (in both stable states) and the first layer 100 for confinement. The capping layer 105 may have a thickness between 10 and 100 nm and be formed of an oxide or insulator, e.g. silicon oxide, silicon nitride, aluminium oxide ($Al_2O_3$), or any other suitable capping material that can be deposited.

The length $l_1$ of the layer of PCM 101 may be less than or equal to the length of the strip or ridge (not shown) and defines a phase-shifting portion WGp1 of the waveguide 100. Where the length $l_1$ of the layer of PCM 101 is less than the length of the strip or ridge, the rest of the waveguide 100 defines one or more non-phase shifting portions WGp2. The length $l_1$ of the layer of PCM 101 or phase shifting portion WGp1 can be chosen to achieve a certain phase shift of light upon switching between states (see FIG. 15). In some applications, the waveguide 100 may comprise a plurality of layers of PCM 101 distributed along the length of the strip or ridge (not shown), each layer of PCM 101 defining a separate phase shifting portion WGp1 of the waveguide 100.

Figure 4:
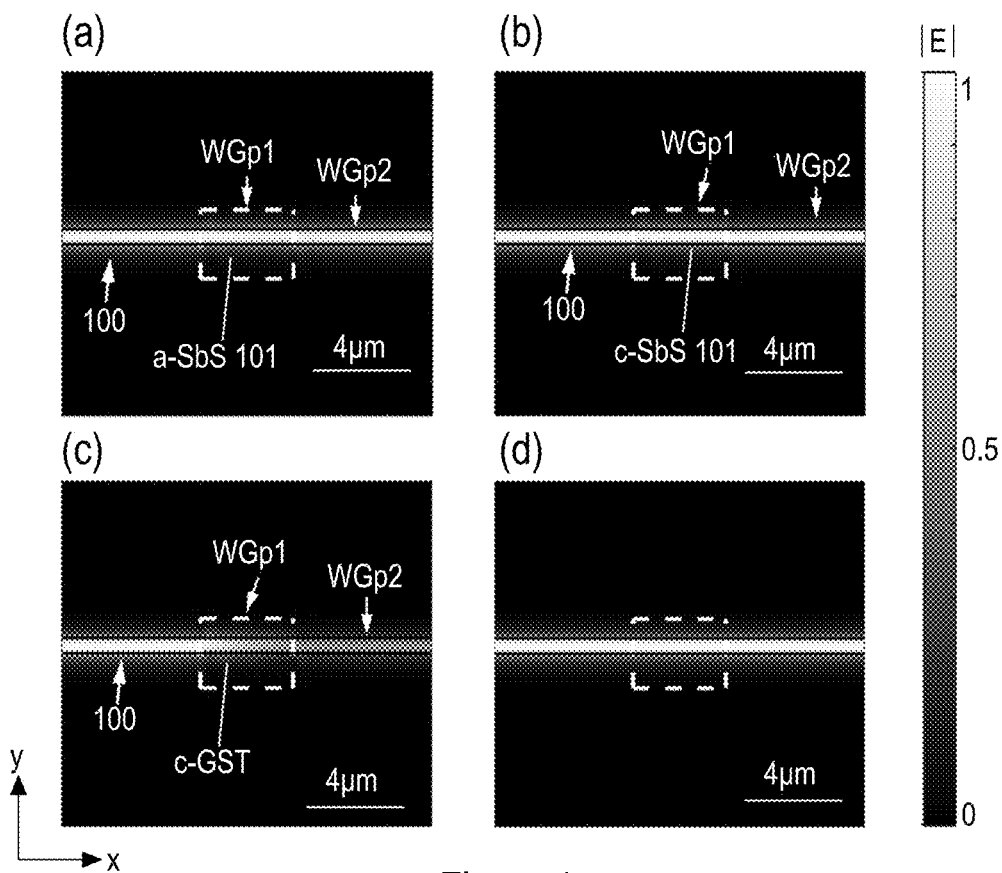
FIGS. 4(a) and (b) show a simulated electric field intensity profile |E|(x,y) of light propagation in a silicon waveguide with a layer of $Sb_2S_3$ phase change material provided over the waveguide in the dashed regions in a crystalline and amorphous state, respectively.
FIG. 4(c) shows a simulated electric field intensity profile |E|(x,y) of light propagation in a silicon waveguide with a layer of GST phase change material provided over the waveguide in dashed region in a crystalline state.
FIG. 4(d) shows a simulated electric field intensity profile |E|(x,y) of light propagation in a reference silicon waveguide silicon waveguide with no phase change material.

FIGS. 4(a) and 4(b) show simulated electric field intensity profiles |E|(x,y) for light ($\lambda$=1550 nm) propagating along an example waveguide 100 where the first layer 102 forms a silicon ridge waveguide with a thickness $t_2$=220 nm, ridge height $r_2$=120 nm, and width $w_2$=650 nm, and a $t_1$=150 nm thick layer of crystalline SbS c-101 (n=2.74) and amorphous SbS a-101 (n=2.61), respectively, is provided over the silicon ridge in the dashed area. FIGS. 4(c) and 4(d) show corresponding propagation profiles for a silicon ridge waveguide with a 150 nm thick layer of crystalline GST (n=7.5, k=2.3) provided over the top in the dashed area, and a silicon ridge waveguide with no PCM for reference. The length of the layer of PCM in FIGS. 4(a)-(c) defines a phase-shifting portion WGp1 of the waveguide, and the rest of the waveguide defines non-phase shifting portions WGp2. The simulations were performed using a 3D finite difference time domain (FDTD) method. The phase of light at the output of the waveguides comprising a layer of PCM is shifted compared to the reference waveguide (not shown). FIGS. 4(a) and 4(b) demonstrate that the amplitude of light propagating along the waveguide 100 is substantially unchanged, and that there is virtually no difference in light intensity at the output of the waveguide 100 when the SbS is in the amorphous or crystalline state—both are comparable to the output power in a reference Si waveguide with no PCM (see FIG. 4(d)). By contrast, the waveguide comprising crystalline GST shows relatively strong attenuation of light due to its relatively high extinction coefficient k.

Figure 5A:
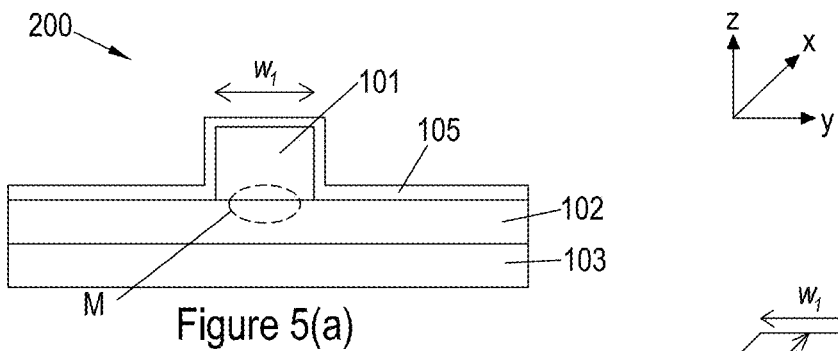
FIGS. 5(a) and 5(b) show, respectively, a schematic cross-sectional and perspective view of an optical waveguide comprising a layer of phase change material according to another embodiment.
Figure 5B:
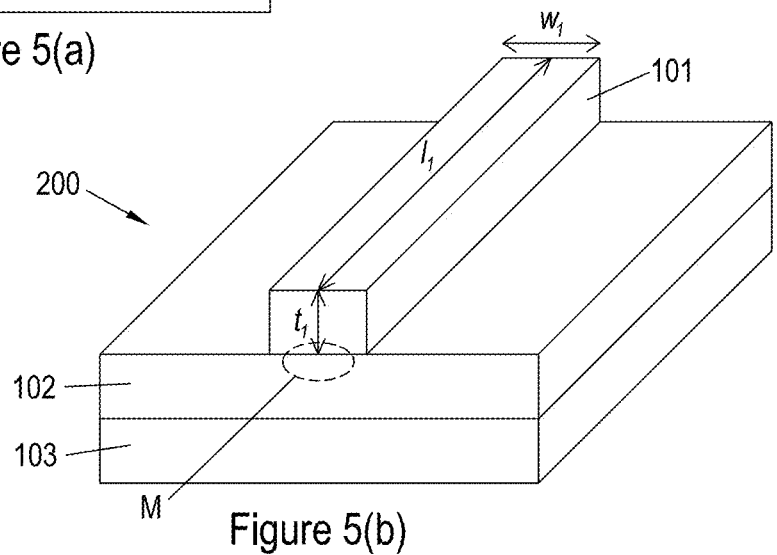

FIGS. 5(a) and 5(b) show a second embodiment 200 of the waveguide 10 where the layer of PCM 101 plays a critical role in the optical confinement and guiding of light. The waveguide 200 comprises, in order, second layer 103, a first layer 102 provided on the second layer 103, and a layer of PCM 101 provided on the first layer 102. The first layer 102 is formed of a material with a higher refractive index than the material of the second layer 102 to form a planar slab waveguide. The second layer 103 may be a substrate layer or part of a substrate layer. The layer of PCM 101 is provided as a strip pattern on a first layer 102 having a length $l_1$ and width $w_1$. The strip of PCM 101 modifies the effective refractive index $n_{eff}$ of the slab waveguide in the region beneath it, which confines light in the width direction (y-axis). The resulting waveguide mode M is indicated schematically by the dashed region. As such, the waveguide 200 is configured as a strip-loaded waveguide 200, at least over the length $l_1$ of the layer of PCM 101. Alternatively, the layer of PCM 101 can comprise a ridge pattern to provide lateral confinement in to the ridge of FIG. 3(a) (not shown). In both cases, the width $w_1$ of the strip or ridge of PCM 101 defines the lateral width of the waveguide 200 over it length $l_1$. As such, in contrast to waveguide 100, in waveguide 200 the layer of PCM 101 is configured to provide the lateral confinement and defines the lateral width of the waveguide 200 over its length $l_1$. The phase-shifting function of the two waveguides 100, 200 is the same. However, because a larger proportion of guided light (the mode M) can exist in the layer of PCM 101 in waveguide 200 compared to waveguide 100, the interaction between the PCM 101 and light is increased and thus the achievable phase shift per unit length of the PCM 101 in waveguide 200 is greater than in waveguide 100.

The waveguide 200 may further comprise a capping or passivation layer 105 covering at least the layer of PCM 101, as described above for waveguide 100. The suitable materials listed above for the first, second and capping layers 102, 103, 105 of waveguide 100 apply equally to those of waveguide 200.

Figure 6:
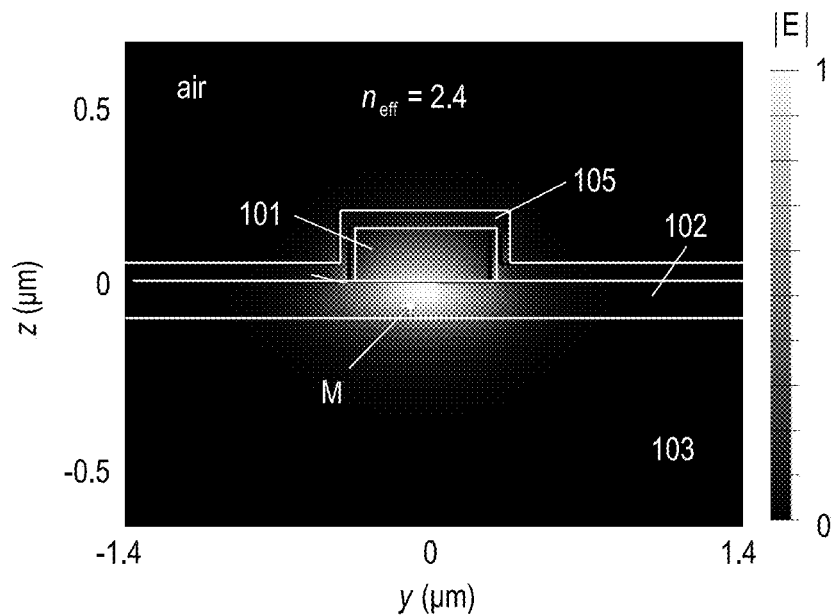
FIG. 6 shows a simulated electric field intensity profile |E|(y,z) of the waveguide mode in a waveguide according to FIG. 5(a)

FIG. 6 shows the simulated electric field intensity profile |E|(y,z) of the fundamental transverse electric (TE) mode M ($\lambda$=1550 nm) of an example waveguide 200 where the second layer 103 is formed of silicon oxide (with a thickness large enough to be considered infinite), the first layer 102 is formed of silicon with a thickness $t_2$=100 nm, the layer of SbS 101 is in a crystalline state (n=2.74) and provided in a strip pattern with a thickness of $t_1$=150 nm and a width of $w_1$=650 nm, and the capping layer 105 is formed of silicon oxide with a thickness $t_5$=50 nm (obtained using a 3D FDTD method). Note that a substantial fraction of mode M exists in the SbS layer 101 due to the similarity to the silicon refractive index (n=3.5). The effective refractive index $n_{eff}$ of the fundamental TE mode is 2.4 when the SbS is the crystalline state and 2.36 when in the amorphous state, demonstrating the non-volatile phase shifting application of the waveguide 200.

In the embodiment described above, the first layer 102 has a higher refractive index than the layer of PCM 101 in both states such that light is predominantly, or at least partially, confined in the first layer 102, but this is not essential. For example, the first layer 102 can be formed of a material with a lower refractive index than the layer of PCM 101, e.g. an oxide such as silicon oxide, such that substantially all the light is confined to and guided by the layer of PCM 101 over its length $l_1$. The second layer 103 may then be formed of material with a refractive index higher than that of the first layer 102, e.g. silicon, provided it is sufficiently separated/de-coupled from the layer of PCM 101.

As with waveguide 100 of the first embodiment, the waveguide 200 may be longer than the length $l_1$ of the layer of PCM 101, such that the length $l_1$ of the layer of PCM 101 defines a phase-shifting portion WGp1 of the waveguide 200. In this case, the phase-shifting portion WGp1 can be seamlessly connected to a non-phase shifting portion WGp2 of the waveguide 200, such as a conventional silicon (or other material) strip or ridge waveguide, enabling co-integration of the waveguide 200 with silicon (or other material) photonic circuits.

Figure 7:
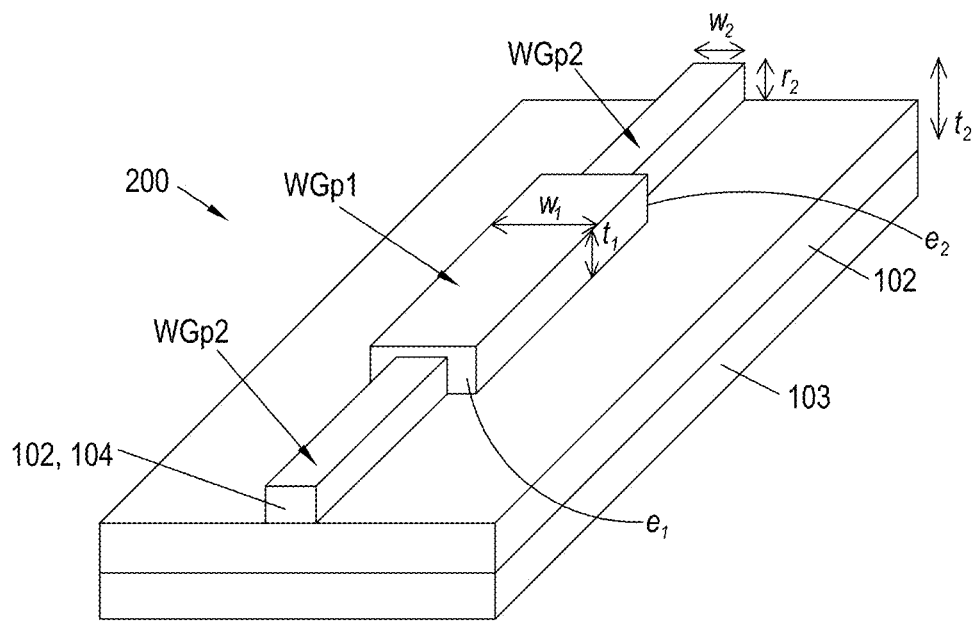
FIG. 7 shows a schematic perspective view of an optical waveguide comprising a layer of phase change material according to another embodiment.

FIG. 7 shows an embodiment of a waveguide 200 comprising a phase shifting portion WGp1 connected at its first end $e_1$ and its second end $e_1$ to a non-phase shifting portion WGp2 for routing light to and from the phase shifting portion WGp1. In the illustrated embodiment, the non-phase shifting portion WGp2 is a ridge waveguide formed on/from the first layer 102. For example, a ridge waveguide may be defined by patterning the first layer 102 (e.g. using an etching process), or depositing a further strip of the same material on the first layer 102 (e.g. a strip of amorphous silicon deposited on crystalline silicon layer). Alternatively, the non-phase shifting portion WGp2 may comprise a third layer 104 provided on the first layer 102 which is formed a different material to the first layer 102. In this case, the refractive index of the third layer 104 may be lower than that of the first layer 102 to form a strip loaded waveguide, or greater than that of the first layer 102 to form a strip waveguide. The relative cross-sectional dimensions of the phase shifting portion WGp1 and non-phase shifting portion WGp2 are configured such that the mode profiles and effective refractive index $n_{eff}$ in each portion are substantially matched.

Figure 8:
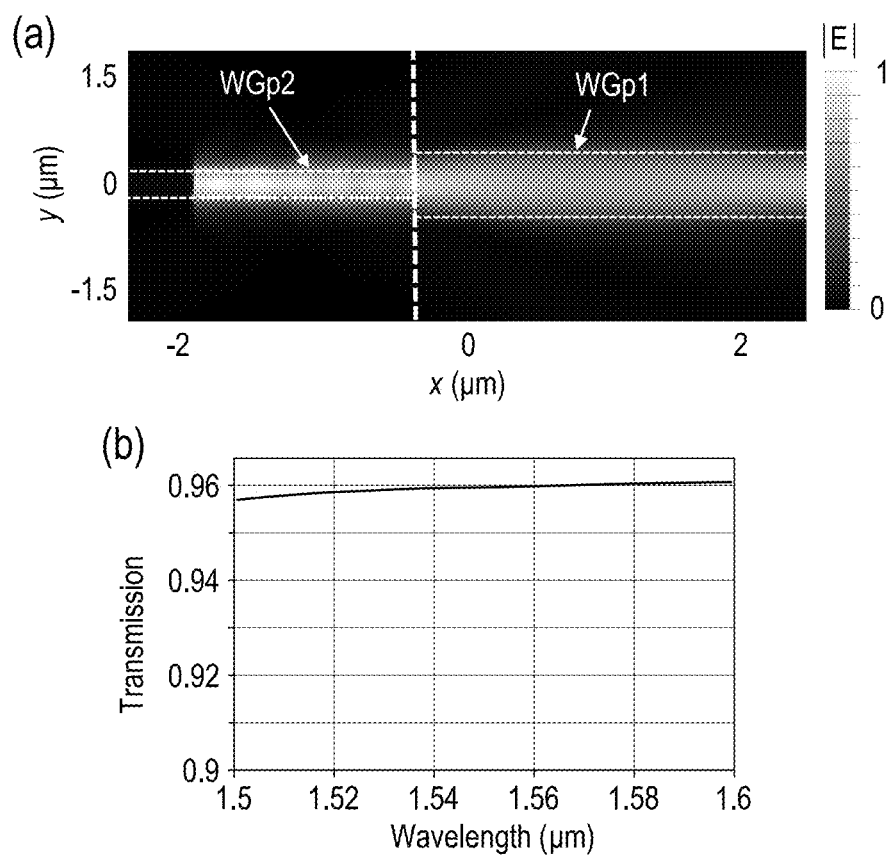
FIGS. 8(a) and 8(b) show, respectively, a simulated electric field intensity profile |E|(x,y) of light propagation in, and transmission spectrum of, a waveguide according to FIG. 7.

FIG. 8(a) shows a simulated electric field intensity profile |E|(x,y) of the fundamental TE mode M ($\lambda$=1550 nm) transmitted from a non-phase shifting portion WGp2 to a phase shifting portion WGp1 of the waveguide 200 (obtained using a 3D FDTD method). In this example, the second layer 103 is formed of silicon oxide (with a thickness large enough to be considered infinite), the first layer 102 is formed of silicon with a thickness $t_2$=100 nm, the layer of SbS 101 is in a crystalline state (n=2.74) and is provided in a strip pattern with a thickness of $t_1$=150 nm and a width of $w_1$=1100 nm, the non-phase shifting portion WGp2 comprises a silicon ridge with a ridge height $r_2$=120 nm and width $w_2$=400 nm, and the capping layer 105 is formed of silicon oxide with a thickness $t_5$=50 nm. With fixed values of $t_1$=150 nm and $r_2$=120 nm, the widths $w_1$, $w_2$ of the waveguide portions WGp1, WGp2 are optimized as 1100 nm and 400 nm, respectively, to match the modal profiles and effective refractive index $n_{eff}$ in each waveguide portion WGp1, WGp2.

FIG. 8(b) shows the simulated transmission spectrum of the waveguide 200 in FIG. 8(a). Transmission is defined as the ratio between the power at the output of the phase shifting portion WGp1 and power at the input of the non-phase shifting portion WGp2. As shown, the waveguide 200 provides high transmission at approximately 0.96 over a broad wavelength range spanning 1.5-1.6 µm, demonstrating efficient mode conversion between the phase shifting and non-phase shifting waveguide portions WGp1, WGp2.

Figure 9A:
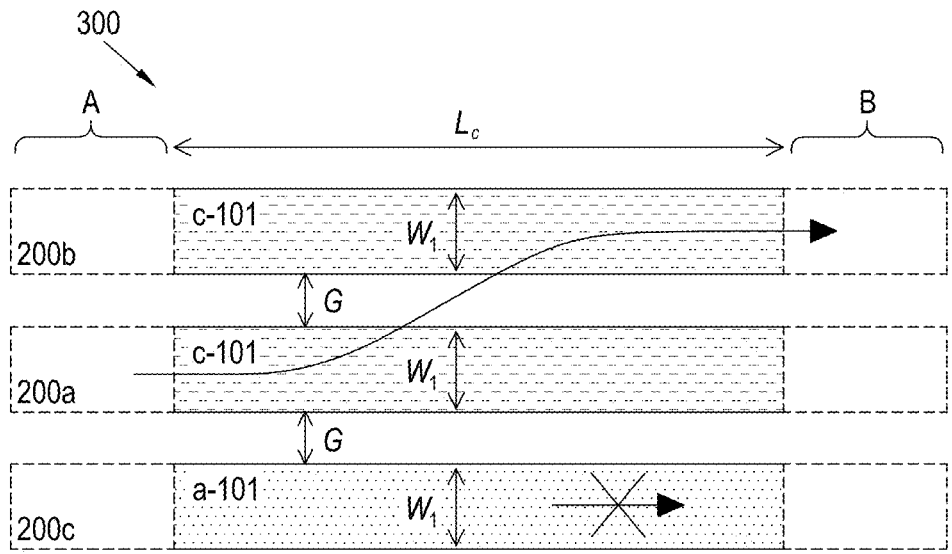
FIGS. 9(a) to 9(c) show schematic top views of optical switching devices comprising three parallel waveguides according to FIG. 1, 3 or 5.

FIG. 9(a) shows an example of an optical switching device 300 for a photonic circuit, comprising three waveguides 200a, 200b, 200c of the second embodiment: a first waveguide 200a, a second waveguide 200b and a third waveguide 200c. The three waveguides 200a-200c are arranged substantially parallel and spaced apart by a lateral gap G over at least a coupling region $L_c$, such that light can evanescently couple from one waveguide 200a-200c to an adjacent waveguide 200a-200c. The geometrical parameters of the waveguides 200a-200c are substantially identical, at least in the coupling region $L_c$. The layer of PCM 101 in each waveguide 200a-200c extends at least for the length of the coupling region $L_c$ as shown, and the degree of optical coupling between adjacent waveguides 200a-200c is dependent on the relative states of the PCM 101 of the respective waveguide in the coupling region $L_c$. Light input to one waveguide (waveguide 200a) can evanescently couple to an adjacent waveguide (waveguide 200a) when the gap G is sufficiently small (on the order of, or less than, the width $w_1$ of the waveguides) and the PCM 101 of the two adjacent waveguides in coupling regions $L_c$ is in the same state (crystalline or amorphous), such that the waveguides have the same effective refractive index $n_{eff}$. This results in optical power transfer between the two adjacent waveguides in the same state. Conversely, substantially no light is transferred between adjacent waveguides when the PCM 101 in coupling regions $L_c$ are in different states.

In FIG. 9(a), the PCM 101 of the first waveguide 200a and second waveguide 200b in the coupling region $L_c$ is in a crystalline state c-101, while the PCM 101 of the third waveguide 200c in the coupling region $L_c$ is in an amorphous state a-101. As such, light input to the first waveguide 200a evanescently couples to the second waveguide 200b, but not the third waveguide 200c. In an embodiment, at least the PCM 101 in the coupling region $L_c$ of each waveguide 200a-200c is switchable between the crystalline and amorphous states to controllable transfer light between adjacent waveguides 200a-200c. Although the switching device 300 comprising three waveguides 200a-200c, it may in general comprise two or more waveguides 200a, 200b depending on the application (see FIG. 13(a)).

The coupling region $L_c$ is defined as the region where the two adjacent waveguides run parallel, are spaced by the gap G, and where the layer of PCM 101 in each waveguide is configurable/switchable to be in the same or different state. If the coupling region $L_c$ is sufficiently long the transfer of light from one waveguide to another can be highly significant, reaching almost 100% when the length of the coupling region $L_c$ equals a critical coupling length optimised for phase-matching conditions, as is known in the art. The critical coupling length for phase matching is dependent on the wavelength of light and the waveguide properties and is defined by coupled mode theory as $Lc=\lambda/(2n_e-2n_o)$, where is the wavelength of light, and $n_e$ and $n_o$ are effective indices of even and odd modes of the waveguide. For longer coupling regions $L_c$, light would then start to coupling back as it propagates. In this embodiment, the coupling region $L_c$ of the switching device 300 is equal to the critical coupling length for phase matching, to selectively couple/transfer substantially all light from the first waveguide 200a to the second waveguide 200b or third waveguide 200c.

Figure 9B:
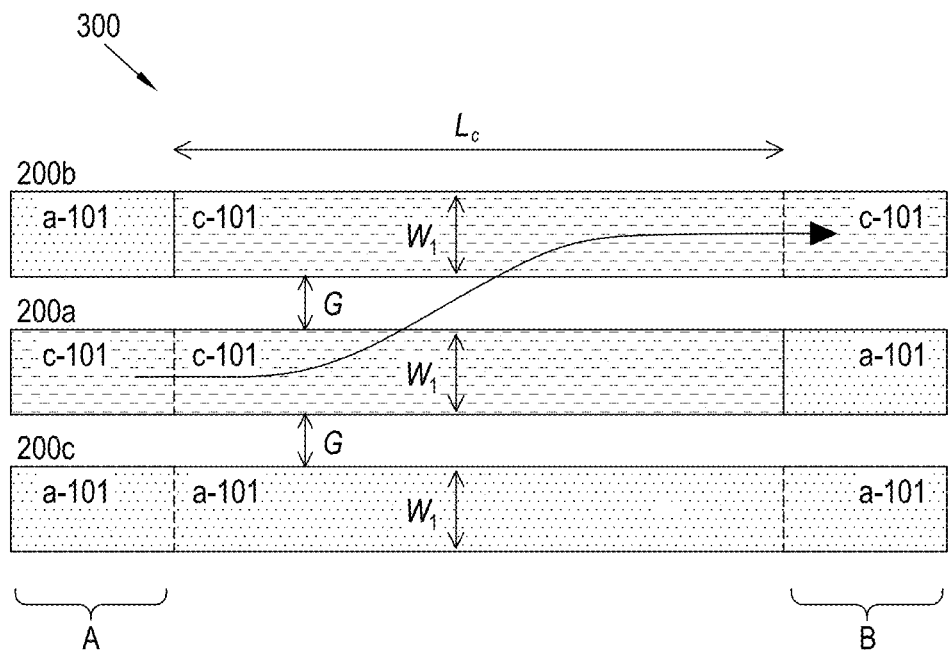

In practice the waveguides 200a-200c will typically be longer than the length of the coupling region $L_c$, and extend from either or both sides of the coupling region $L_c$, indicated by the dashed regions A and B. In this case, the coupling region $L_c$ can be defined by the region where the PCM 101 in each adjacent waveguide overlap, or by the region where a portion of the PCM 101 in each adjacent waveguide overlap in the same (e.g. crystalline) state for optical transfer. For example, the PCM 101 of each waveguide 200a-200c may extend from both the input side (region A) and the output side (region B) of the coupling region $L_c$ as shown in FIG. 9(b), and at least the portion of the PCM 101 of each waveguide 200a-200c in the coupling region $L_c$ is switchable between the crystalline and amorphous states. In another example, the input waveguide, in this case the first waveguide 200a, may extend from the input side (region A) of the coupling region $L_c$, and the output waveguides, in this case the second and third waveguides 200b, 200c, may extend further from the output side (region B) of the respective coupling region $L_c$ to define the overlapping coupling region $L_c$, as shown in FIG. 9(c).

Figure 9C:
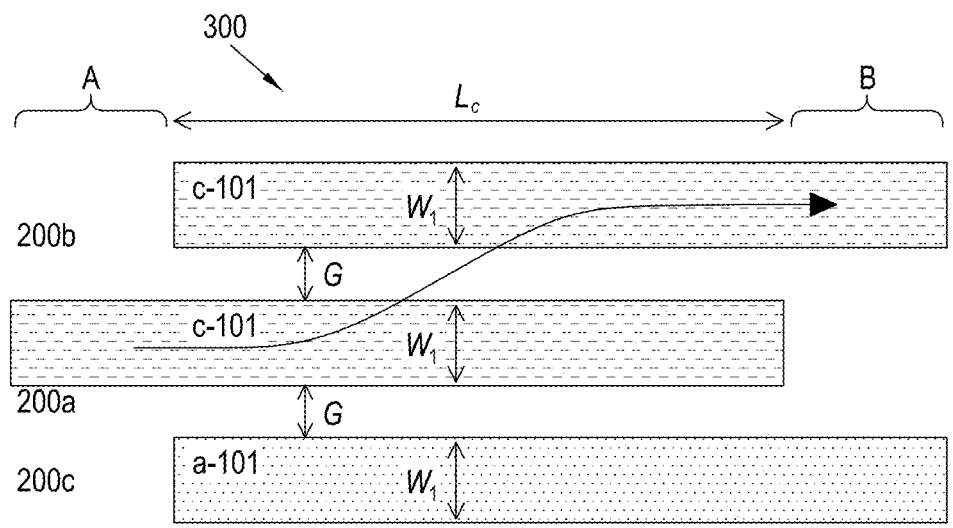
Figure 10A:
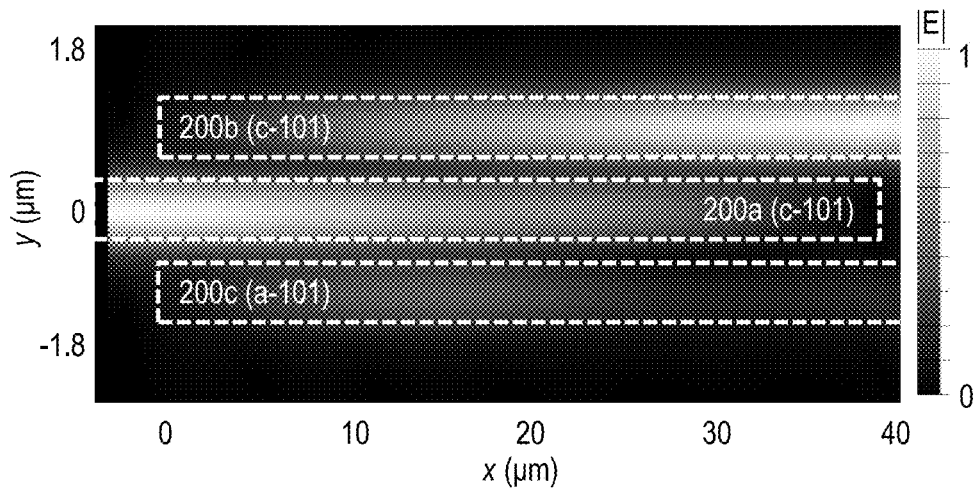
FIGS. 10(a) and 10(b) show, respectively, a simulated electric field intensity profile |E|(x,y) of light propagation in a device according to FIG. 9(c)

FIG. 10(a) shows a simulated electric field intensity profile |E|(x,y) of the fundamental TE mode M (λ=1550 nm) in an optical switching device 300 with the configuration of FIG. 9(c) as light is transmitted from the first waveguide 200a to the second waveguide 200b (obtained using a 3D FDTD method). In this example, the second layer 103 is formed of silicon oxide (with a thickness large enough to be considered infinite), the first layer 102 is formed of silicon with a thickness $t_2$=100 nm, the layer of SbS 101 (n=2.74 and 2.61 in the crystalline and amorphous states, respectively) is provided as a strip with a thickness of $t_1$=150 nm and a width of $w_1$=650 nm, the capping layer 105 is formed of silicon oxide with a thickness $t_5$=50 nm, the gap is G=400 nm, and the length of coupling region $L_c$ (equal to the critical coupling length) is 38 μm. FIG. 10(a) shows that substantially all the light is coupled from the first waveguide 200a to the second waveguide 200b when in the same crystalline state, while minimal light couples to the third waveguide when in the amorphous state.

Figure 10B:
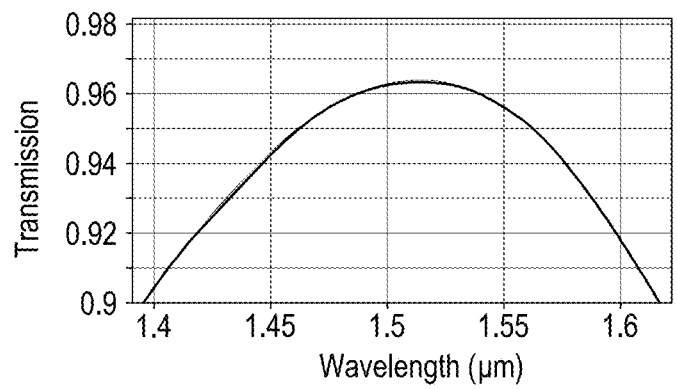

FIG. 10(b) shows the simulated transmission spectrum from the first waveguide 200a to the second waveguide 200b in the device 300 of FIG. 10(a) with the above defined parameters. Transmission is defined by the ratio between the power at the output of the second waveguide 200b and power at the input of the first waveguide 200a. Transmission is above 0.96 in a wavelength range of 1487-1540 nm, meaning the insertion loss is less than 0.13 dB. The corresponding 0.3 dB working bandwidth is 227 nm (1390-1617 nm).

The working principle of the optical switching device 300 is that substantially all the light can be coupled between adjacent waveguides when they are phase matched, i.e. when the PCM 101 of both adjacent waveguides in the coupling region $L_c$ is in the same state and the length of the coupling region $L_c$ is equal to the critical coupling length for phase-matching conditions. If the length of the coupling region $L_c$, or the length of the overlap between the portions in the same state (e.g. the crystalline portions c-101), is less than the critical coupling length for phase-matching conditions, a smaller proportion of light is transferred between the adjacent waveguides. This principle can be applied to provide a variable power splitter device, as described below.

Figure 11:
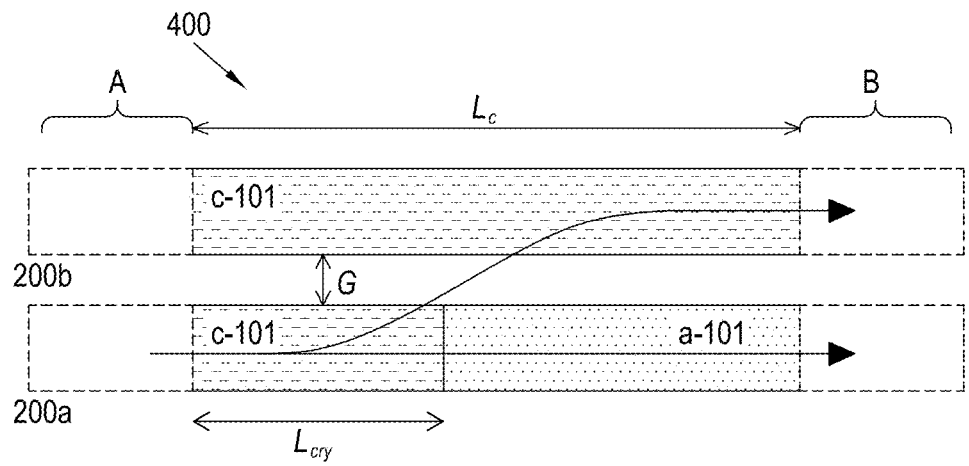
FIG. 11 shows a schematic top view of a power splitting device comprising two parallel waveguides according to FIG. 1, 3 or 5.

FIG. 11 shows an example of a variable optical power splitting device 400 for a photonic circuit. The device 400 comprises a first waveguide 200a and a second waveguide 200b arranged substantially parallel and spaced apart by a lateral gap G over at least a coupling region $L_c$, such that light can evanescently couple from the first waveguide 200a to the second waveguide 200b, as described above. As with the switching device 300, the geometrical parameters of the waveguides 200a, 200b are substantially identical, at least in the coupling region $L_c$, and the layer of PCM 101 in each waveguide 200a-200c extends at least for the length of the coupling region $L_c$. At least a portion of the PCM 101 of each waveguide 200a, 200b in the coupling region $L_c$ is in the same state, the crystalline state in this example, and the crystalline portions c-101 overlap by an overlap length $L_{cry}$ that is variable, as shown. Similar to the switching device 300, light input to the first waveguide 200a can evanescently couple to the second waveguide 200b when at least a portion of the PCM 101 of each waveguide 200a, 200b in coupling regions $L_c$ is in the same state and overlap, but in this case, the amount of input light transferred to the second waveguide 200b is variable from approximately 0 to approximately 100% by varying the overlap length $L_{cry}$ between zero and $L_c$. Any light that is not transferred to the second waveguide 200b, i.e. when $L_{cry}$<$L_c$, continues to propagate in the first waveguide 200a. In this way, the device 400 provides a variable optical power splitting function, where the spitting ratio from the first waveguide 200a to the second waveguide 200b is dependent on the overlap length $L_{cry}$.

Figure 12A:
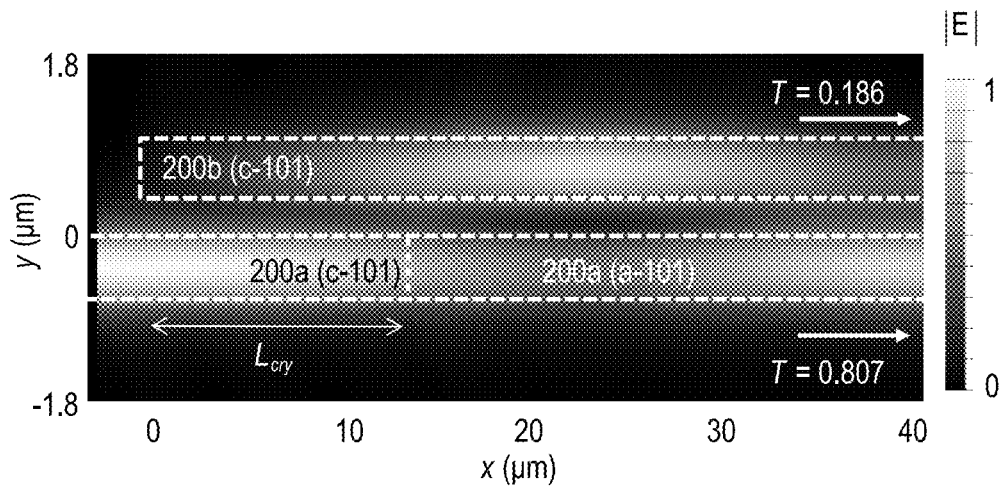
FIGS. 12(a) and 12(b) show, respectively, a simulated electric field intensity profile |E|(x,y) of light propagation, and the transmission in each waveguide as a function of overlap length, in a device according to FIG. 11.
Figure 12B:
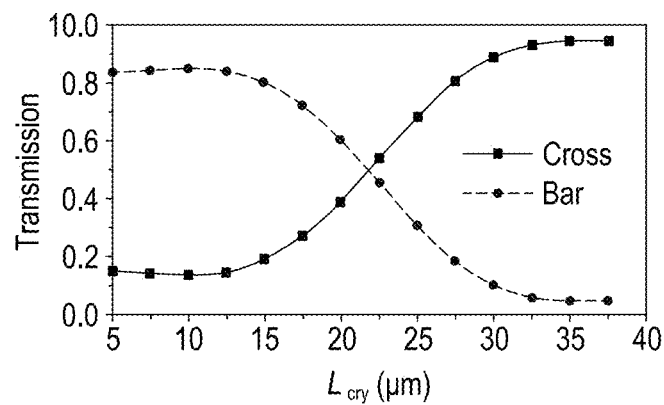

FIG. 12(a) shows a simulated electric field intensity profile |E|(x,y) of the fundamental TE mode M (λ=1550 nm) in the power splitting device 400 as light is partially transferred from the first waveguide 200a to the second waveguide 200b (obtained using a 3D FDTD method). The length of the coupling region $L_c$ is 41 μm, and the overlap length $L_{cry}$ is 15 μm. Other material and geometric parameters are the same as those used for the simulation of FIG. 10(a). In the simulated device 400 configuration, 18.6% of light is transferred across from the first waveguide 200a to the second waveguide 200b, as defined by the ratio between the power at the output of the second waveguide 200b and the power at the input of the first waveguide 200a. The remaining 80.7% of light continues to propagate in the first waveguide 200a. FIG. 12(b) shows the simulated transmission of the device 400 in the cross state and bar state as a function of $L_{cry}$ at a wavelength of 1.55 μm. Transmission in the cross state is defined by the ratio between the power at the output of second waveguide 200b and power at the input of the first waveguide 200a. Transmission in the bar state is defined by the ratio between the power at the output of the first waveguide 200a and power at the input of the first waveguide 200a. In the cross state, transmission can be varied between 0.138 and 0.949 by varying the overlap length $L_{cry}$. In the bar state, transmission can be varied between 0.854 and 0.05. These results demonstrate the wide tunability of the power splitter 400.

The above principles may be applied to selectively couple light, completely or at least partially, between any number of adjacent waveguides 200, as described below.

Figure 13A:
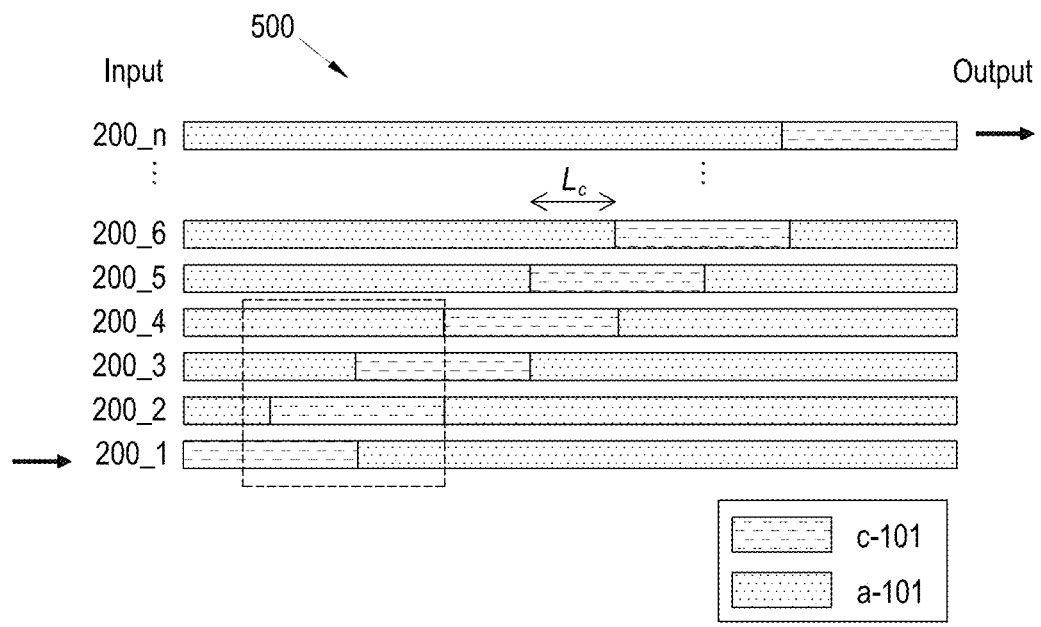
FIG. 13(a) shows a schematic top view of a field programmable coupler array (FPCA) comprising a plurality of parallel waveguides according to FIG. 1, 3 or 5.

FIG. 13(a) shows an example of a photonic field-programmable coupler array (FPCA) 500 for a photonic circuit. The FPCA 500 comprises an array of n waveguides 200_1-200_n arranged substantially parallel and spaced apart by a lateral gap G, such that light can evanescently couple between adjacent waveguides. The FPGA 500 is configurable to route light from an input waveguide 200 (e.g. waveguide 200_1) to one or more output waveguide 200 (e.g. waveguide 200_n) via a number of intermediate waveguides 200 (e.g. waveguides 200_2 to 200_n-1). Initially the layer of PCM 101 of each waveguide 200 may be in the same state, e.g. the amorphous state. With this general architecture, one can program an arbitrary light routing/power splitting path in the FPCA 500 by crystallizing one or more portions of PCM 101 in each waveguide 200. Once configured, each waveguide 200 comprises at least one crystalline portion of PCM c-101 that overlaps a crystalline portion c-101 of an adjacent waveguide 200 in the array by an overlap length $L_{cry}$ (where 0<$L_{cry}$≤$L_c$), such that light can be completely or at least partially transferred between the adjacent waveguides 200 in the array 500, as described above. The overlap length $L_{cry}$ between each pair of adjacent waveguides 200 may be same, or one or more pairs may have a different overlap, depending on the number and position of the output waveguides 200.

In the illustrated embodiment, the overlapping crystalline portions c-101 are staggered or cascaded in the direction of propagation from the input waveguide 200 (waveguide 200_1) to the output waveguide 200 (waveguide 200_0, such that the crystalline portion c-101 of each waveguide 200 overlaps the crystalline portion c-101 of its adjacent waveguides 200 by $L_c$, the critical coupling length for phase matching. In this configuration, substantially all light can be efficiently transferred/routed from the input waveguide 200 (waveguide 200_1) to the output waveguide 200 (waveguide 200_n). However, it will be appreciated that other configurations are possible. In other embodiments with different overlap configurations, light can be routed from any input waveguide 200 to any number of output waveguides 200 by programming or reprogramming the crystallized pattern in FPCA 500.

Figure 13B:
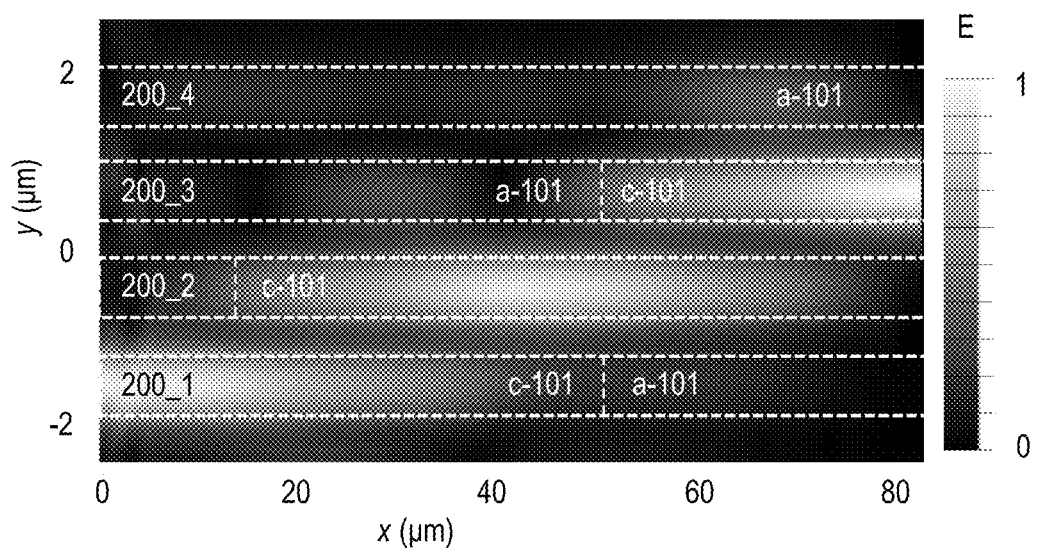
FIG. 13(b) shows a simulated electric field intensity profile |E|(x,y) of light propagation through part of a FPCA according to FIG. 13(a)

FIG. 13(b) shows a simulated electric field intensity profile |E|(x,y) of the fundamental TE mode M (λ=1550 nm) in a portion of the FPCA 500 of FIG. 13(a) (indicated by the dashed box) as light is transferred from the input waveguide 200 (waveguide 200_1) to a third waveguide 200 (waveguide 200_3) (obtained using a 3D FDTD method).

Figure 14:
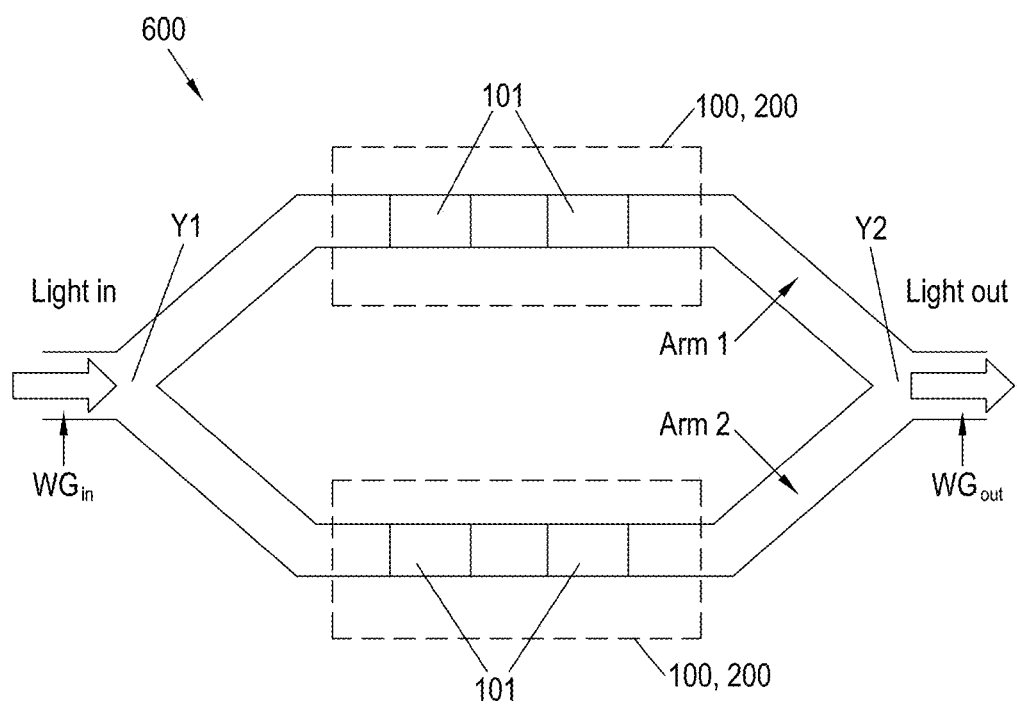
FIG. 14 shows a schematic top view of a Mach-Zehnder interferometer (MZI) comprising a waveguide according to FIG. 1, 3 or 5 in each arm.

FIG. 14 shows an example Mach-Zehnder interferometer (MZI) 600 for a photonic circuit. The MZI 600 comprises an input waveguide $WG_{in}$, an output waveguide $WG^{out}$, and first and second waveguide arms 1, 2 connected in parallel between the input waveguide $WG_{in}$ and output waveguide $WG_{out}$ which define a respective first and second optical path. One or both arms 1, 2 comprise a phase-only waveguide 100, 200 according to the first or second embodiment to selectively shift the phase of light in the respective arm 1, 2.

Light input to the MZI 600 is split, preferably equally, between arm 1 and arm 2 at a Y-branch splitter Y1 and recombines at Y-branch combiner Y2 where interference takes place. The power at the output waveguide $WG_{out}$ can thus be varied between a minimum and a maximum value by shifting the phase in one or both of the arms 1, 2 to vary the phase difference at the combiner Y2 between 0 and π. Here, the waveguides 100, 200 are phase-shifters, and output power of the MZI 600 is modulated by selectively switching the state of the PCM 101 of the waveguide 100, 200 in one or both arms 1, 2 to shift the phase without attenuation. The phase shift induced by the waveguide 100, 200 is dependent on the length $l_1$ of the layer of PCM 101 and $n_{eff}$. As such, the length $l_1$ of the layer of PCM 101 of the waveguide 100, 200 can be chosen to produce the desired phase shift, e.g. π for switching applications. The waveguide 100, 200 may comprise one layer of PCM 101, or a plurality of layers of PCM 101 distributed along the waveguide 100, 200 to achieve the desired phase shift, as shown in FIG. 14. A plurality of of layers of PCM 101 in one or more both arms 1, 2 may increase the resolution of the programmable phase shift, e.g. where a number of discrete phase shifts between 0 and π are required.

The layer of PCM 101 can be switched between the amorphous and crystalline states by heating the PCM 101 to a predetermined temperature for a predetermined period of time, as is known in the art. For example, the layer of PCM 101 may be switchable from the amorphous state to the crystalline state upon application of heat at or above a crystallisation temperature for a first period of time, and switchable from the crystalline state to the amorphous state upon application of heat at or above an amorphization temperature for a second period of time. The crystallisation temperature of SbS is approximately 290° C. and the amorphization temperature is the melting temperature which is approximately 550° C. The first period of time is typically longer than the second period of time.

The layer of PCM 101 may be switched simply by heating or annealing the waveguide 100, 200 in an oven or on a hot plate. However, for practical applications (e.g. in photonic circuits) the layer of PCM 101 can be switched by applying localised heat either optically, using incident optical pulses with sufficient power and pulse width (at a wavelength where the PCM is absorptive, e.g. at visible wavelengths), or electrically, using a heater in thermal contact with the layer of PCM 101 or by passing an electrical current pulse through the layer of PCM 101. Electrical switching may be preferably in certain applications where accurate control over the region of PCM 101 being switching is required, e.g. allowing a certain portion of the PCM 101 to be switched.

In an embodiment, the waveguide 100, 200 comprises a resistive heating element (heater) in thermal contact with at least a longitudinal portion of the layer of PCM for switching the state of the PCM 101 at least at that longitudinal portion (not shown). The waveguide 100, 200 may comprise a plurality of resistive heating elements, each in thermal contact with separate longitudinal portion of the layer of PCM 101 for switching the state of the PCM 101 at least at the respective longitudinal portions.

In another embodiment, the waveguide 100, 200 comprises a pair of electrodes coupled to the layer of PCM 101 for driving an electrical current through the PCM to switch the state of the PCM 101 (not shown). FIGS. 15(a) and (b) show optical images of a MZI 600 comprising a waveguide 100 in arm 1 with a PCM length $l_1$ of 5 μm and 55 μm, respectively. The MZI 600 comprises silicon ridge waveguides with a 45 nm thick layer of SbS 101 deposited over the silicon ridge in the areas indicated. The silicon ridge has a thickness $t_2$=220 nm, ridge height $r_2$=120 nm, and ridge width $w_2$=650 nm, and the device 600 is covered with a 15 nm thick layer of silicon oxide. To quantify the phase shift, six different MZIs 600 where fabricated where the length $l_1$ of the layer of SbS a-101 in arm 1 is varied between 10 μm and 60 μm in 10 μm increments. Each device includes a 5 μm long layer of SbS 101 in arm 2, which is subtracted from the length $l_1$ of the SbS 101 in arm 1. FIG. 15(c) shows the attenuation spectrum of the MZI devices with different $l_1$ for wavelengths around 1550 nm, where the SbS is in the amorphous state. A clear red-shift (towards longer wavelength) in the spectrum is observed as the length $l_1$ of the SbS increases. FIG. 15(d) shows the same amorphous spectra (solid lines) together with the corresponding attenuation spectra of the MZI devices after the SbS has been switched to the crystalline state (dashed lines) by annealing at 290 degrees Celsius for 20 mins (the spectrum for each device is shifted for ease of reference). The crystalline spectrum for each device is red-shifted compared to the amorphous spectrum due to the phase shift introduced by the change in $n_e$m Moreover, the shift introduced by switching states increases approximately linearly with the length $l_1$ of the SbS 101, as shown in FIG. 15(e) where the spectrum shifts for the amorphous and crystalline states have been converted into a phase shift relative to a reference MZI device with no PCM. FIG. 15(f) shows the resulting phase shift produced upon switching the state of the SbS from amorphous to crystalline. This demonstrates a switch-induced phase shift in excess of 2π for a 41 μm long layer of SbS.

FIGS. 16(a)-(g) show experimental results demonstrating reversible dynamic switching of the SbS 101 in a photonic circuit. FIGS. 16(a) and 16(b) show optical images of two silicon-based ring resonator devices 700, 800 comprising a waveguide 100 for phase-only modulation. Device 700 comprises a straight waveguide 710 coupled to a ring waveguide 720, and device 800 comprises two straight waveguide 810, 812 coupled to a ring waveguide 820. The waveguides 710, 720, 810, 812, 820 are silicon ridge waveguides, and each ring waveguide 720, 820 has a 45 nm thick layer of SbS 101 deposited over the ring in the dashed area. The silicon ridge has a thickness $t_2$=220 nm, ridge height $r_2$=120 nm, and ridge width $w_2$=650. A 15 nm thick capping layer 105 of silicon oxide was deposited over the devices 700, 800. The straight waveguides 710, 810, 812 comprise input and output grating couplers for coupling light in and out of the devices 700, 800. To demonstrate reversible switching of the SbS 101 a free-space laser was used to deliver focused incident optical pulses ($\lambda$=633 nm) to locally heat the SbS 101 (spot size of approximately 1 μm). A pulse width of 400 ns and power of 80 mW was used for amorphization, and a pulse width of is and power of 34 mW was used for crystallization. FIG. 16(c) shows a magnified optical image of the waveguide 100 in the device 700 after a small region of the SbS 101 layer has been switched from the crystalline state to the amorphous state using a single shot amorphization pulse. Subsequently, a crystallisation pulse was applied to switch back the same area (not shown). In this experiment, the switching volume per pulse is dependent on the laser spot size which is smaller than the area of the SbS 101. A larger area of SbS 101 was reversibly switched by scanning the laser spot over the area of SbS 101 (not shown).

FIG. 16(d) shows the transmission spectrum (output power divided by input power) of the device 800 for wavelengths around 1550 nm measured after various crystallisation and amorphization pulses have been applied to different areas the SbS 101 (seven crystallisation pulses and two amorphization pulses). Similar to the MZI device of FIG. 15, interference occurs between light in the straight waveguides 710, 810, 812 and ring waveguides 720, 820 of the ring resonator devices 700, 800 causing a characteristic oscillatory pattern in the transmission spectrum, as shown. FIG. 16(e) shows a close up of the transmission spectra in the highlighted area of FIG. 16(d) for the seven crystallisation pulses, and FIG. 16(f) shows a corresponding close up for the two amorphization pulses, where the arrows indicate the progression of the spectra after each pulse. In FIG. 16(f), the curve to the most right is the spectrum taken before an amorphization pulse is applied, whereas in FIG. 16(e), the curve to the most left is the spectrum taken after the first crystallization pulse is applied. The transmission spectra show a red shift after an amorphization pulse and a blue shift after a crystallization pulse. As more area of the SbS layer 101 is switched, the spectrum shifts further, as indicated by the arrows in FIGS. 16(e) and 16(f).

FIG. 16(g) shows the measured output (readout) power of the ring resonator device 700 as a function of time (at a resonance wavelength $\lambda$=1557.7 nm of the device 700) when a single area of the SbS 101 is subjected to a series of amorphization and crystallisation pulses. The output power shows reversible step changes according to the state of the SbS 101 due to phase shifts, demonstrating reversible switching of SbS. The anomalous peak preceding crystallisation is due to the thermo-optic effect (i.e. temperature induced change in n) when a long is crystallisation pulse is applied. FIG. 16(h) shows the reversible switch-induced changes in the output (readout) power over an extended time period (normalised to the maximum and minimum values), demonstrating the temporal stability of the device 700. The apparent drift in the maximum and minimum values is attributed to the variable environmental effects associated with the free-space laser annealing process used (despite the presence of a capping layer 105).

Figure 15:
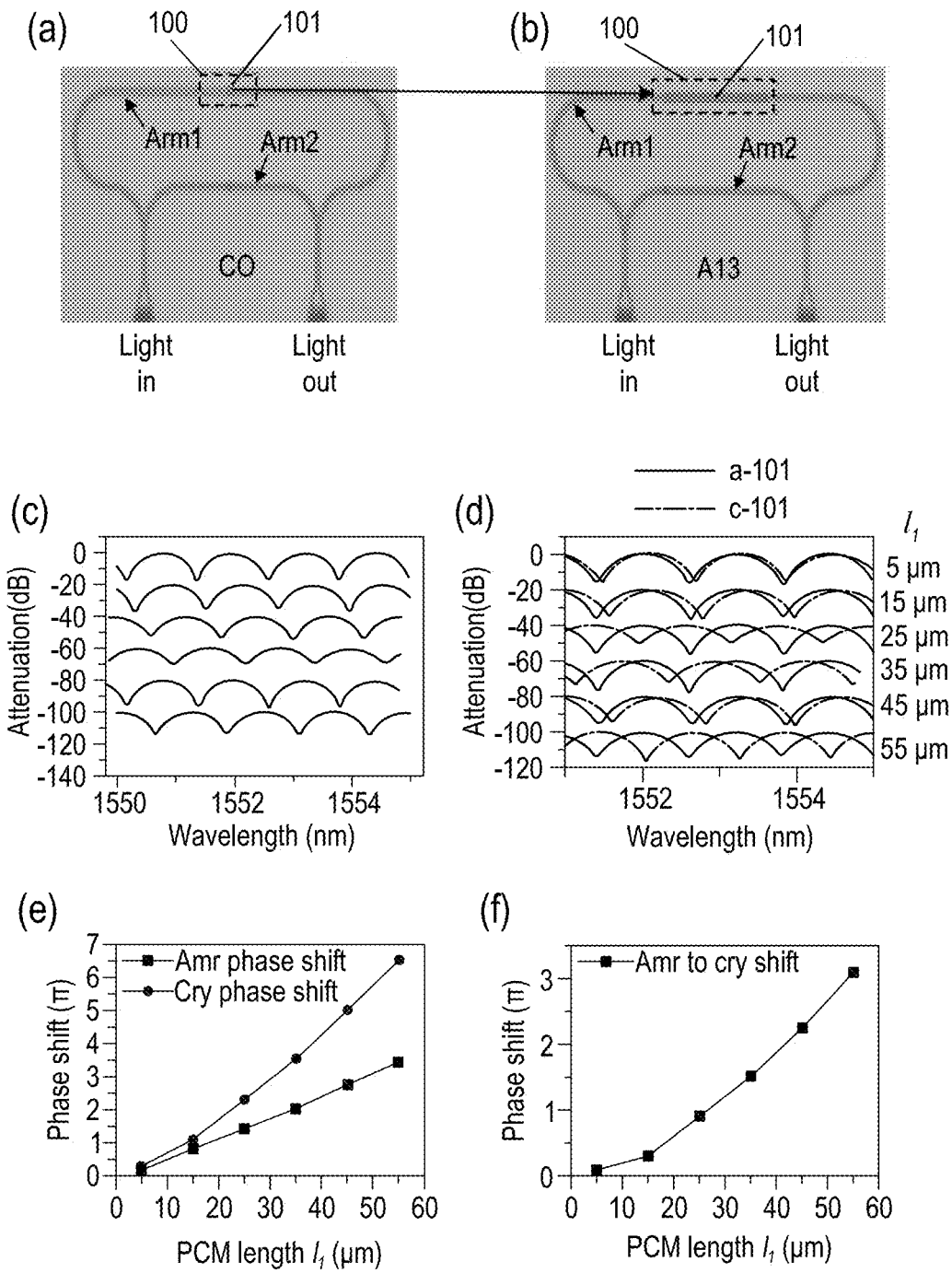
FIGS. 15(a) and 15(b) show optical images of a fabricated MZI comprising a waveguide according to FIG. 3 with different lengths of $Sb_2S_3$ phase change material in one arm.
FIGS. 15(c) and 15(d) show experimental attenuation data for MZIs with different lengths of $Sb_2S_3$ phase change material in one arm when in the crystalline and amorphous states.
FIG. 15(e) shows the experimentally determined phase shift as a function of the length of the $Sb_2S_3$ phase change material when in the crystalline and amorphous states compared to an MZI with no $Sb_2S_3$ phase change material, obtained from the data of FIGS. 15(c) and 15(d)
FIG. 15(f) shows the experimentally determined phase shift as a function of the length of the $Sb_2S_3$ phase change material upon switching from the amorphous to crystalline state, obtained from the data of FIGS. 15(e)
Figure 16:
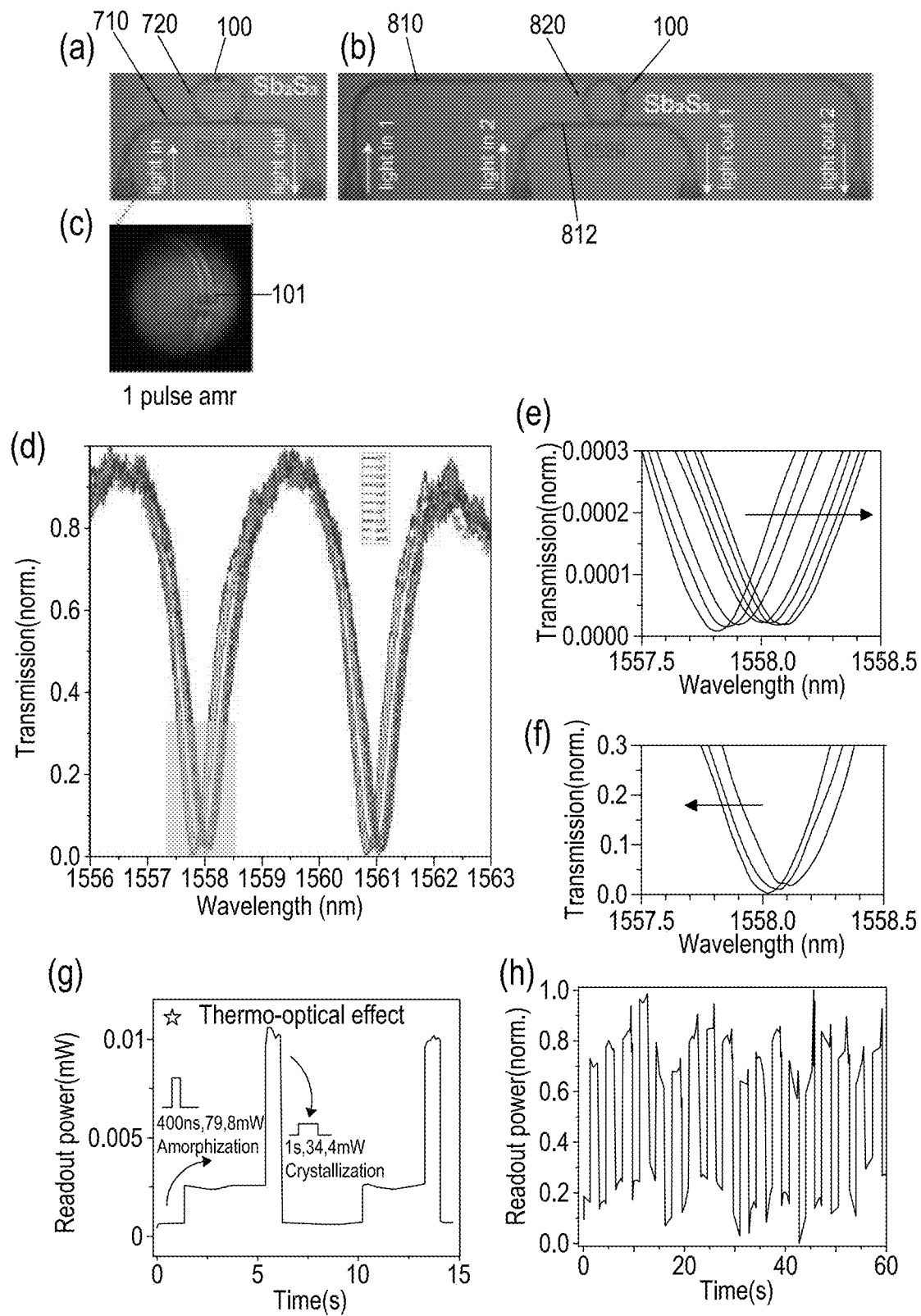
FIGS. 16(a) and (b) show optical images of a ring resonator device comprising a waveguide according to FIG. 3.
FIG. 16(c) shows an optical image of the waveguide in FIG. 16(a) after switching the state of a portion of the phase change material.
FIG. 16(d) shows the transmission spectra of the device in FIG. 16(a) after various crystallisation and amorphization optical pulses were applied to the phase change material.
FIGS. 16(e) and (f) show a close up of the data in FIG. 16(d) for crystallisation and amorphization pulses, respectively.
FIGS. 16(g) and (h) show the output power as a function of time during a series of reversible switching events.

Although the experimental results in FIGS. 15 and 16 are shown for the waveguide 100 of the first embodiment, it will be appreciated that equivalent results can be achieved with the waveguide 200 of the second embodiment (however, the increased phase shift per unit length of PCM 101 achievable in waveguide 200 will amplify the switch-induced changes in transmission).

The results in FIGS. 15(a)-(f) and 16(a)-(h) demonstrate the reversible, non-volatile and substantially lossless phase shifting function of the waveguide 100, 200 in photonics circuits. Non-volatility and ultralow attenuation in the telecom wavelength band enables phase shifting devices to be substantially lossless at any targeted phase, paving the way for phase tuning in scaling up photonic circuits without extra energy consumption. The substantial phase shifting over relatively small distances (e.g. $2\pi$ phase shift in a $l_1$=41 μm long layer of PCM 101 in waveguide 100) can improve the integration density of the photonic circuit, and reversible dynamic phase shifting enables future applications in optical routing and photonic computation.

The waveguides 100, 200 of the invention can be fabricated with conventional top-down processes such as optical lithography, electron beam lithography, reactive ion etching, evaporation, etc. For example, the waveguide 100 can be fabricated by first patterning a ridge or strip in the first layer 102 using electron-beam lithography and reactive ion etching, and then defining the layer of PCM 101 using optical or electron-beam lithography, deposition and a lift-off process. The waveguide 200 can be fabricated by optical or electron-beam lithography, deposition of PCM and a lift-off process to define a strip of PCM 101 on the first layer 102. Alternatively, the waveguide 200 can be fabricated by first depositing a layer of PCM 101 on the first layer 102, and then patterning a strip or ridge of PCM 101 using electron-beam lithography and a reactive ion etching process. Any physical or chemical deposition method can be used to deposit the layer of PCM 101, such as electron beam evaporation, sputtering, atomic layer deposition, etc. Preferably, RF sputtering is used for deposition of SbS 101.

Figure 17:
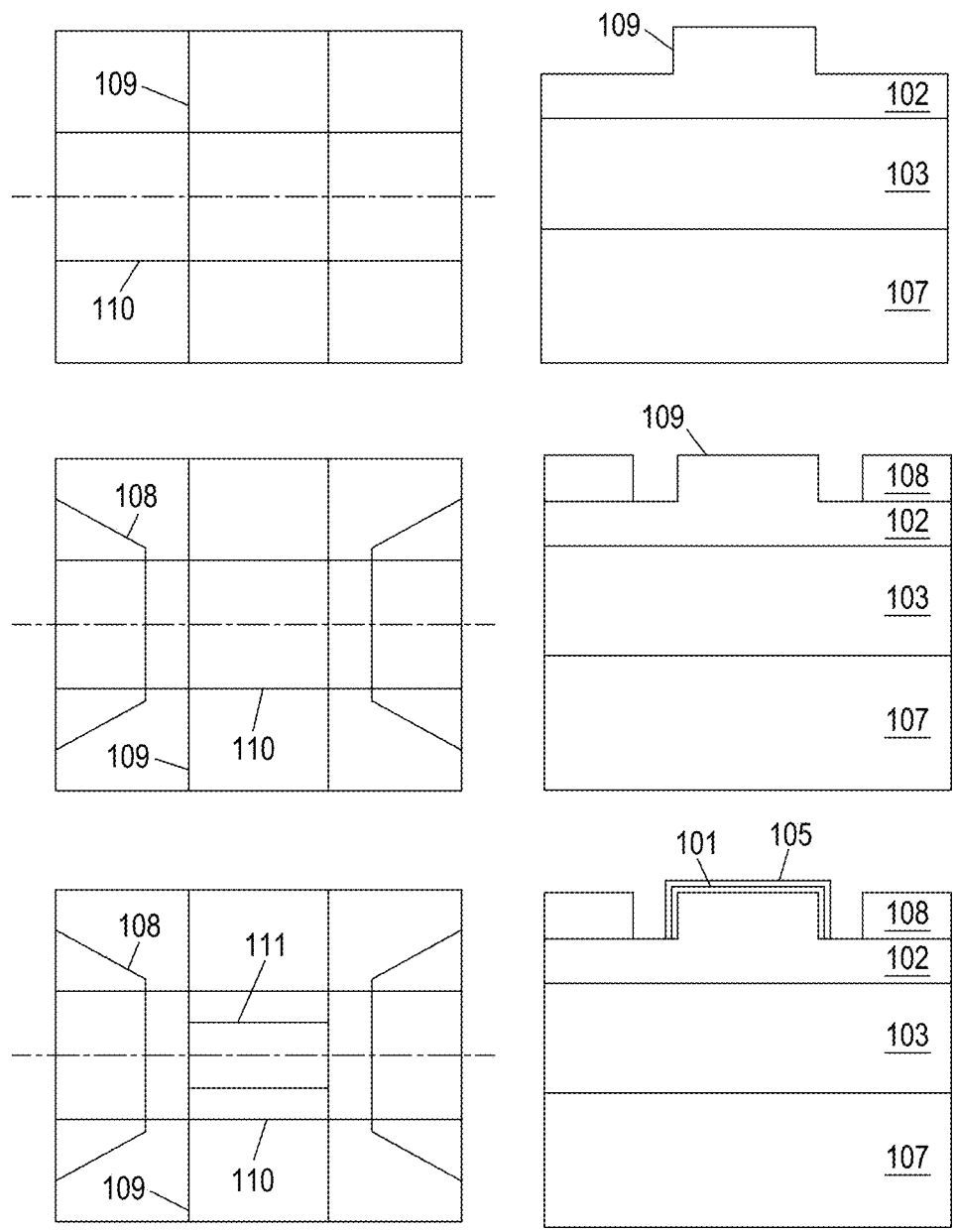
FIG. 17 shows a schematic of a device comprising an implanted resistive heating element for changing the state of the phase change material.

FIG. 17 shows a schematic of three fabrication stages for a waveguide according to an embodiment. The process starts with a silicon on insulator substrate (SOI), comprising SOI layer 102, silicon oxide layer 103 and silicon substrate 107. In the top row, a ridge waveguide 109 has been defined by partially etching the SOI layer 102, and a heating element 110 has been created by a patterned implant region (e.g. P++). The heating element 110 may be implanted prior to partial etching of the silicon to form ridge 109, or after. The depth of the implant may comprise the full depth of the SOI layer, or only part thereof. The heating element 110 comprises a portion of the waveguide ridge 109, and extends to either side of the ridge 109 so that metal contact pads can make contact with it.

The top row in FIG. 17 shows a layout and sectional view (along the centre line) after the steps that define the implanted heater 110 and the ridge 109.

The middle row in FIG. 17 shows a layout and sectional view (along the centre line) after steps that define a metal layer that electrically contacts the heater 110 on either side of the ridge 109. The metal layer may comprise aluminium. The total resistance of the heating element (from aluminium contact pad to aluminium contact pad) may be 100 ohms or less.

The bottom row in FIG. 17 shows a layout and sectional view (along the centre line) after steps that define a phase change material 101 and capping layer 105. In this schematic the phase change material 101 and capping layer 105 are co-patterned into the same rectangular region 111, but in other embodiments the capping layer 105 may be oversized with respect to the phase change material.

The phase change material may be $Sb_2S_3$ or $Sb_2Se_3$ and the capping layer may be ITO (both layers are sputtered and patterned by a lift-off process).

Figure 18:
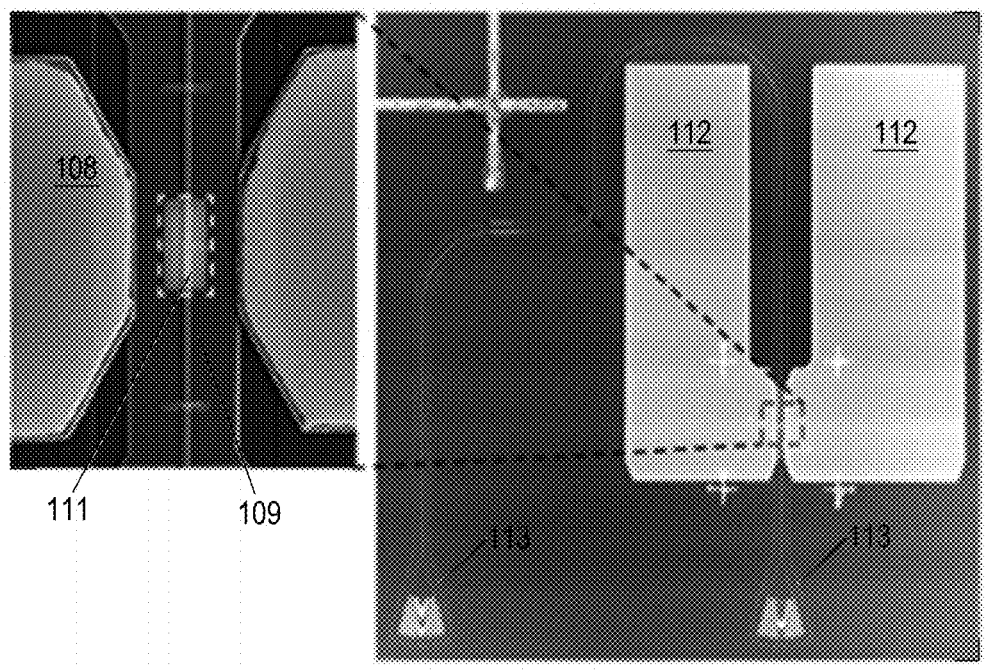
FIG. 18 shows a micrograph of a fabricated device similar to that shown schematically in FIG. 17, with an implanted resistive heating element.

FIG. 18 shows a micrograph of a completed waveguide device produced with a process similar to that schematically illustrated in FIG. 17. The image with larger field of view on the right includes contact pads 112 (e.g. for probe needles of a test station, or bond wires/solder bumps to a package or integrated circuit for driving the heater). Out-of-plane couplers 113 are also shown, for coupling light into the ridge waveguide 109. In this example the phase change material was $Sb_2Se_3$, the capping material was ITO, the waveguide was SOT, and the integrated heater formed by a P++ doped channel in the SOI layer. The metal contacts were aluminium.

Figure 19:
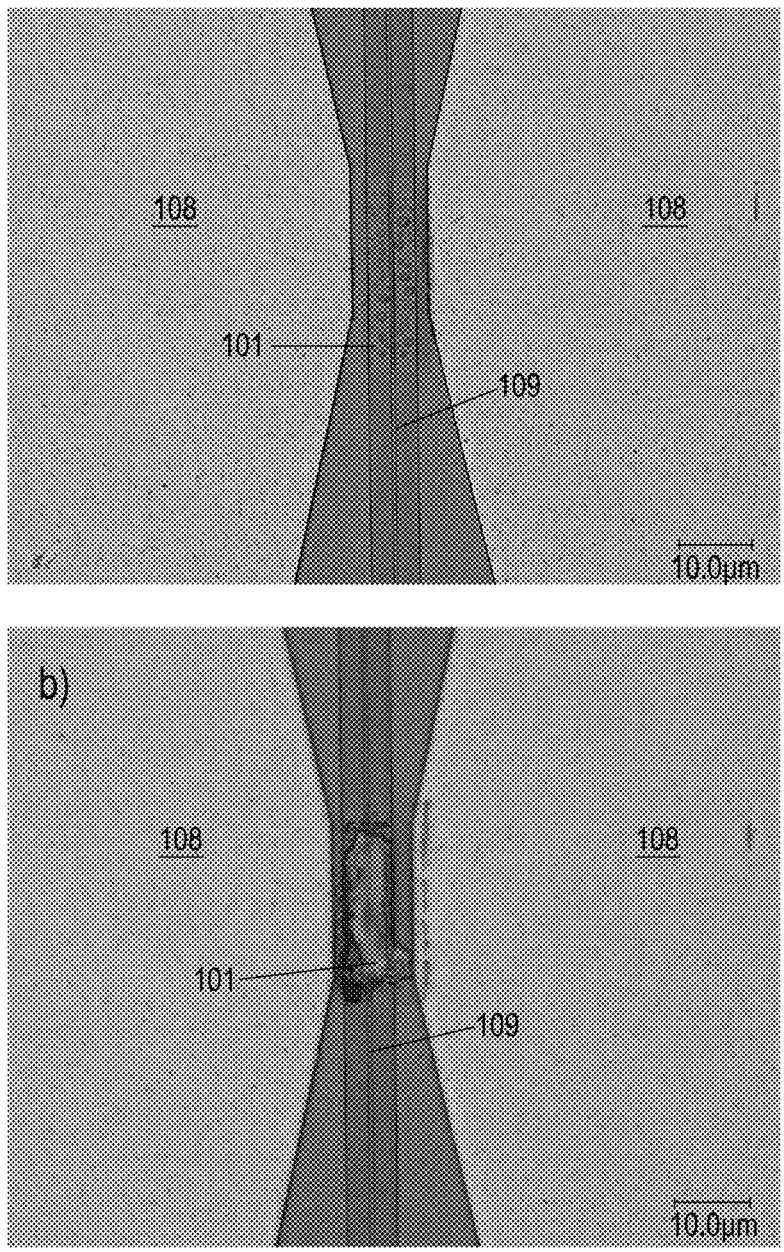
FIG. 19 shows micrographs of a fabricated device with an integrated heating element showing a) before heating with the heating element; and b) after heating with the integrated heating element.

FIG. 19 illustrates controlling phase change using an integrated heating element in an embodiment similar to that described with reference to FIGS. 17 and 18. The heating element comprises a P++ doped channel in the SOI that runs under the waveguide 109 (and may comprise a portion thereof). At a) the phase change material (in this case SbSe) is shown after hot-plate annealing in the crystalline state, and b) the phase changbene material is shown after an electrical pulse has been applied through the heating element, resulting in heating of the phase change material and a change towards the amorphous state (almost all the film has changed state). In this example the length of the doped channel comprising the heater was 20 microns and the resistance across the aluminium electrodes was 50 ohms.

Figure 20:
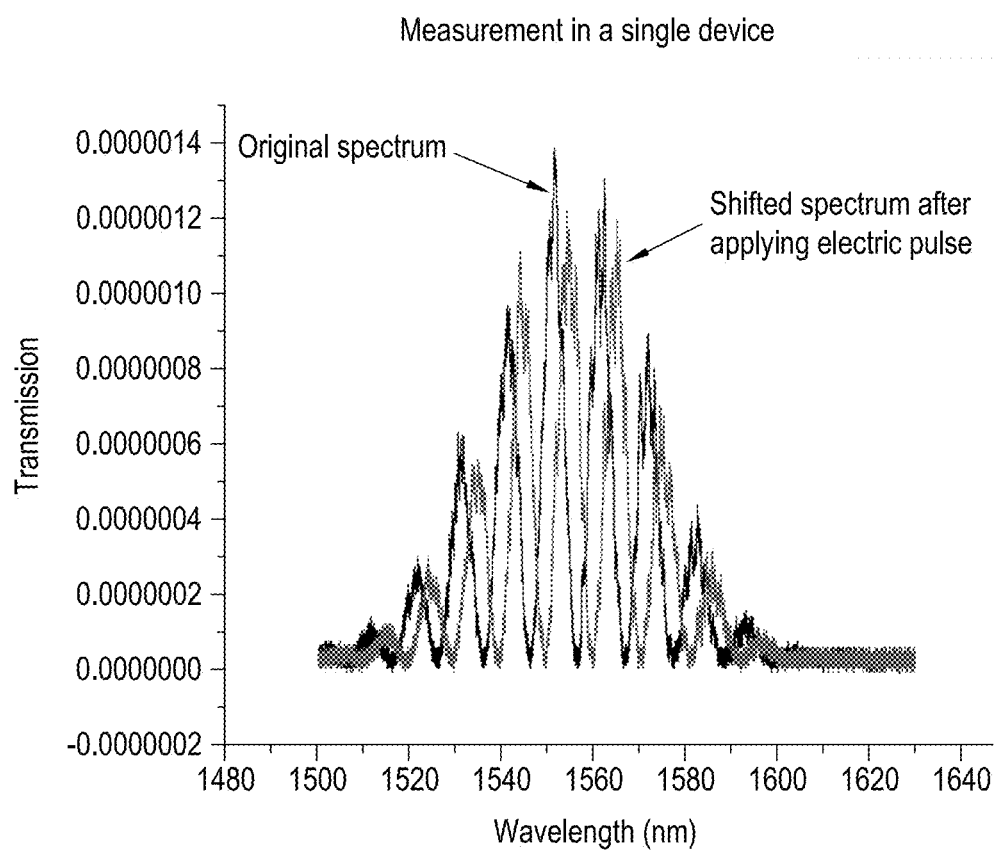
FIG. 20 shows transmission spectra through a Mach-Zehnder device according to an embodiment before and after an electric pulse is applied to a heating element to change the state of a phase change material in one of the legs of the Mach-Zehnder device.

FIG. 20 illustrates results obtained by an operational Mach-Zehnder device according to an embodiment comprising a SbSe phase change material and an integrated heating element. A spectrum obtained before a pulse has been applied to the phase change material is shown along with a spectrum obtained after a pulse has been applied to the phase change material. The electrical pulse in this case was 100 ns pulse at 9V, and an obvious phase shift is introduced to the spectrum by the resulting change in state in the phase change material. There is no significant change in loss after the switching operation, because the phase material has a negligible extinction coefficient in the range of the spectra that are measured (i.e. from 1500 nm to 1630 nm). The results are from an early prototype, and show promising performance.

From reading the present disclosure, other variations and modifications will be apparent to the skilled person that are within the scope of this disclosure and the claims. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination.

The invention claimed is:

1. An optical waveguide for guiding light in a photonic circuit comprising a layer of phase change material for modulating the phase of the guided light,
wherein the phase change material is switchable between at least a stable crystalline state and a stable amorphous state each with different refractive indexes, and the phase change material exhibits an extinction coefficient of less than 0.1 in both states for wavelengths greater than 1000 nm, wherein the phase change material is formed of or comprises a chalcogenide comprising antimony selected from: antimonide trisulphide ($Sb_2S_3$) and antimonide triselenium ($Sb_2Se_3$).

2. The waveguide of claim 1, wherein the phase change material exhibits an extinction coefficient of less than 0.05 or 0.01, or substantially zero, in both states for wavelengths greater than 1000 nm.

3. The waveguide of claim 1, wherein the phase change material exhibits an extinction coefficient of substantially zero in both states and a refractive index difference between the two states of at least 0.1 at a wavelength of 1550 nm.

4. The waveguide of claim 1, comprising a plurality of layers of phase change material distributed along the waveguide.

5. The waveguide of claim 1, wherein the waveguide comprises a first layer formed of a first material, and the layer of phase change material is provided on the first layer in a pattern to define a lateral width of the waveguide; or
wherein the waveguide comprises a first layer formed of a first material that defines the width of the waveguide, and the layer of phase change material is provided over the first layer and is evanescently coupled thereto.

6. The waveguide of claim 5, wherein refractive index of the phase change material is lower than the refractive index of the first material in at least one of the two states.

7. The waveguide of claim 5, wherein the first layer is formed of or comprises a material selected from the group comprising: silicon, silicon nitride, indium phosphide, gallium phosphide, germanium, and lithium niobate.

8. The waveguide of claim 5, wherein the first layer is formed of or comprises a silicon layer of a silicon-on-insulator substrate.

9. The waveguide of claim 1, further comprising:
i) a resistive heating element in thermal contact with at least a longitudinal portion of the layer of phase change material for switching the state of the phase change material at least at that longitudinal portion; or
ii) a plurality of resistive heating elements, each in thermal contact with separate longitudinal portion of the layer of phase change material, for switching the state of the phase change material at least at the respective longitudinal portions.

10. The waveguide of claim 1, wherein the layer of phase change material has a thickness in the range 50 nm to 200 nm.

11. An optical device for a photonic circuit, comprising a first waveguide and a second waveguide each as defined in claim 1, wherein:
the first and second waveguides are arranged substantially parallel and spaced apart by a lateral gap, over at least a coupling region thereof, such that light can evanescently couple from the first to the second waveguide in the coupling region, and
the degree of optical coupling from the first to the second waveguide is dependent on the relative states of the phase change material of the first and second waveguides in the coupling region.

12. The device of claim 11, wherein the phase change material of the first and second waveguides in the coupling region is configurable to be in the same state or different states to selectively couple light from the first waveguide to the second waveguide.

13. The device of claim 12, wherein the length of the coupling region is equal to a critical coupling length for phase-matching to selectively couple substantially all light from the first waveguide to the second waveguide.

14. The device of claim 11, further comprising a third waveguide configured the same as either the first or the second waveguide, the third waveguide arranged substantially parallel to and spaced apart from the first or second waveguide by a lateral gap, over at least a respective coupling region thereof, such that light can evanescently couple from the first or second waveguide to the third waveguide in the respective coupling region, and wherein the degree of optical coupling from the first or second waveguide to the third waveguide is dependent on the relative states of the phase change material of the third waveguide and the first or second waveguide in the coupling region.

15. The device of claim 14, wherein the phase change material of the third waveguide and the first or second waveguide in the coupling region is configurable to be in the same state or different states to selectively couple light from the first or second waveguide to the third waveguide.

16. The device of claim 15, wherein the length of the coupling region of the first or second waveguide and the third waveguide is equal to a critical coupling length for phase-matching to selectively couple substantially all light from the first or second waveguide to the third waveguide.

17. The device of claim 11, wherein the length of the coupling region is equal to a critical coupling length for phase-matching, and at least a longitudinal portion of the phase change material of each waveguide in the coupling region is in the same state and overlaps by an overlap length that is variable for varying the degree of optical coupling between respective waveguides.

18. A photonic field programmable coupler array comprising an array of waveguides as defined in claim 1 arranged substantially parallel to and spaced apart from each by a lateral gap, over at least a respective coupling region thereof, such that light can evanescently couple from one waveguide to an adjacent waveguide in the respective coupling region, wherein at least a longitudinal portion of the phase change material of each waveguide in the respective coupling region is configurable to be in the same state and overlap the corresponding longitudinal portion of an adjacent waveguide by an overlap length to selectively transfer light across two or more adjacent waveguides in the array.

19. A Mach-Zehnder interferometer for a photonic circuit comprising first and second parallel optical paths, wherein the first and/or second optical path comprises a waveguide as defined in any of claim 1.

* * * * *